United States Patent [19]

Kasagami et al.

[11] Patent Number: 5,315,222
[45] Date of Patent: May 24, 1994

[54] CONTROL APPARATUS FOR INDUSTRIAL ROBOT

[75] Inventors: Fumio Kasagami, Ikoma; Akinobu Izawa, Osaka, both of Japan

[73] Assignee: Daihen Corporation, Osaka, Japan

[21] Appl. No.: 82,728

[22] Filed: Jun. 28, 1993

[30] Foreign Application Priority Data

Jul. 3, 1992 [JP] Japan .................................. 4-200232

[51] Int. Cl.$^5$ .............................................. G05B 19/42
[52] U.S. Cl. ............................. 318/568.11; 318/568.1; 318/561; 318/628; 395/80; 395/83
[58] Field of Search ............................... 318/560–646; 364/474.01–474.36; 395/80–99; 901/1, 3, 5, 7, 9, 12, 13, 15, 18, 19, 20, 21; 414/730–736

[56] References Cited

U.S. PATENT DOCUMENTS 4,860,215 8/1989 Seraji ..................................... 395/95
4,999,553 3/1991 Seraji ..................................... 318/561
5,023,808 6/1991 Seraji ..................................... 395/83
5,086,400 2/1992 Hayati et al. ......................... 395/95

FOREIGN PATENT DOCUMENTS 0440816 8/1991 European Pat. Off. ...... G05B 19/42
6437603 2/1989 Japan .
 282302 3/1990 Japan .
3239486 10/1991 Japan .

Primary Examiner—Paul Ip
Attorney, Agent, or Firm—Michael D. Bednarek

[57] ABSTRACT

An apparatus is provided for controlling an industrial robot of the type which holds a workpiece for movement relative to a fixed tool or a series of fixed tools. The robot control apparatus prepares and stores a task program which itself includes teaching data regarding the positional and attitudinal relation $wXt_j$ of the tool tip relative to the workpiece reference point as well as the setting data regarding the tool and the workpiece.

6 Claims, 29 Drawing Sheets

CONTROL APPARATUS FOR INDUSTRIAL ROBOT

BACKGROUND OF THE INVENTION

1. Field of the Invention

This invention relates to a control apparatus for an industrial robot. More particularly, the present invention relates to a control apparatus which is advantageously used for controlling an articulated industrial robot of the type which holds a workpiece for movement relative to a fixed tool.

2. Description of the Prior Art

Industrial robots are widely used in various applications for greatly reducing the burden of workers in factories. The robot is also used for performing a job with extreme precision and/or in a dangerous site.

Conventionally, an articulated industrial robot is made to hold a tool such as a grinder, a welding torch or a cutter for movement relative to a workpiece removably held by a fixed workpiece holder. In this case, therefore, it is necessary to provide a separate transfer mechanism for transferring the workpiece to and from the workpiece holder. As a result, the overall arrangement tends to become bulky and complicated.

In view of the above problem, it has been proposed to cause an articulated industrial robot to hold a workpiece for movement relative to a fixed tool, as disclosed for example in Japanese Patent Applications Laid-open Nos. 64(1989)-37603, 2(1990)-82302 and 3(1991)-239486. According to this proposal, the robot can be also utilized for transferring the workpiece to and from the tool within the maximum movable space of the robot, thereby streamlining the process without requiring a separate transfer mechanism.

According to the teaching of Japanese Patent Applications Laid-open Nos. 2(1990)-82302 and 3(1991)-239486 mentioned above, the control apparatus for the robot prepares a plurality of teaching data (constituting a task program) by memorizing, at each teaching point, the positional and attitudinal relation of a robot mechanical interface point (tip end) relative to a robot base reference point or the positional and attitudinal relation of the robot base reference point relative to the mechanical interface point. In other words, the control apparatus memorizes only the desired robot movement as the teaching data.

According to the teaching of Japanese Patent Applications Laid-open Nos. 64(1989)-37603, on the other hand, the robot control apparatus prepares a plurality of teaching data by memorizing the target positions of the workpiece relative to the robot mechanical interface point.

Further, the prior art control apparatus disclosed in the three laid-open Japanese applications equally controls the robot on the premise that the tool and the workpiece configuration will not be changed.

The prior art control apparatus described above has been found to have various disadvantages. Several of these disadvantages are briefly enumerated below. The reasons for the disadvantages of the prior art will be readily understood from the detailed description of the present invention given hereinafter and therefore not specifically described here. (1) The task program including the teaching data as to the relation between the robot tip end and the robot base or the robot tip end and the workpiece is not directly indicative of the relation between the tool and the workpiece, so that it is difficult to realize, from the task program, how the workpiece is worked on by the tool.

(2) It is difficult to use the CAD (computer aided design) data of a workpiece for making a task program.

(3) It is difficult to modify the task program for adaption to a change in the position and/or attitude of the tool, to a change in the configuration and/or dimension of the workpiece, and to a change in the workpiece holding position provided by the tip end of robot.

(4) The robot is capable of operating only with respect to a single tool. Thus, it is impossible for the single robot to perform successive jobs on the workpiece by a series of tools.

SUMMARY OF THE INVENTION

It is, therefore, an object of the present invention to provide a robot control apparatus wherein the task program is directly indicative of the positional and attitudinal relation of a tool relative to a workpiece.

Another object of the present invention is to provide a robot control apparatus which facilitates the use of CAD workpiece data for preparing a task program.

A further object of the present invention is to provide a robot control apparatus wherein the task program can be easily modified to improve the robot movement.

Still another object of the present invention is to provide a robot control apparatus which enables the robot to operate successively relative to a series of tools.

A further object of the present invention is to provide a robot control apparatus wherein most content of the existing task program can be conveniently utilized for making a new task program when there is a change in the position and attitude of the tool, the configuration of the workpiece, or the holding position of the workpiece.

According to the present invention, there is provided a control apparatus for an articulated industrial robot which holds a workpiece for movement relative to at least one fixed tool, the robot having a base reference point and a mechanical interface point, the tool having a tool tip, the workpiece having a workpiece reference point, the control apparatus comprising: setting data input means for entering setting data which include a positional and attitudinal relation $Et$ of the tool tip relative to the robot base reference point as well as a positional and attitudinal relation $Ew$ of the workpiece reference point relative to the robot mechanical reference point; means for determining a positional and attitudinal relation $T$ of the robot mechanical interface point relative to the robot base reference point; means for supplying a positional and attitudinal relation $wXt_j$ of the tool tip relative to the workpiece reference point and for supplying a translational speed $v_j$ of the workpiece relative to the tool; task programming means for preparing and storing a task program which includes a plurality of teaching data corresponding to teaching points, each of the teaching data containing at least the relation $wXt_j$ and the translational speed $v_j$; teaching data extraction means for successively taking out the teaching data from the task program; trajectory planning means for planning a trajectory of the workpiece relative to the tool in accordance with the teaching data taken out by the teaching data extraction means; interpolation means for interpolating the trajectory between each two successive teaching points; and instruction means for causing the robot to move the workpiece along the interpolated trajectory.

Various features and advantages of the present invention will become apparent from the following description of the preferred embodiments given with reference to the accompanying drawings.

DETAILED DESCRIPTION OF THE PREFERRED EMBODIMENTS

The present invention will now be described in more specific detail referring to the accompanying drawings.

Figure 1:
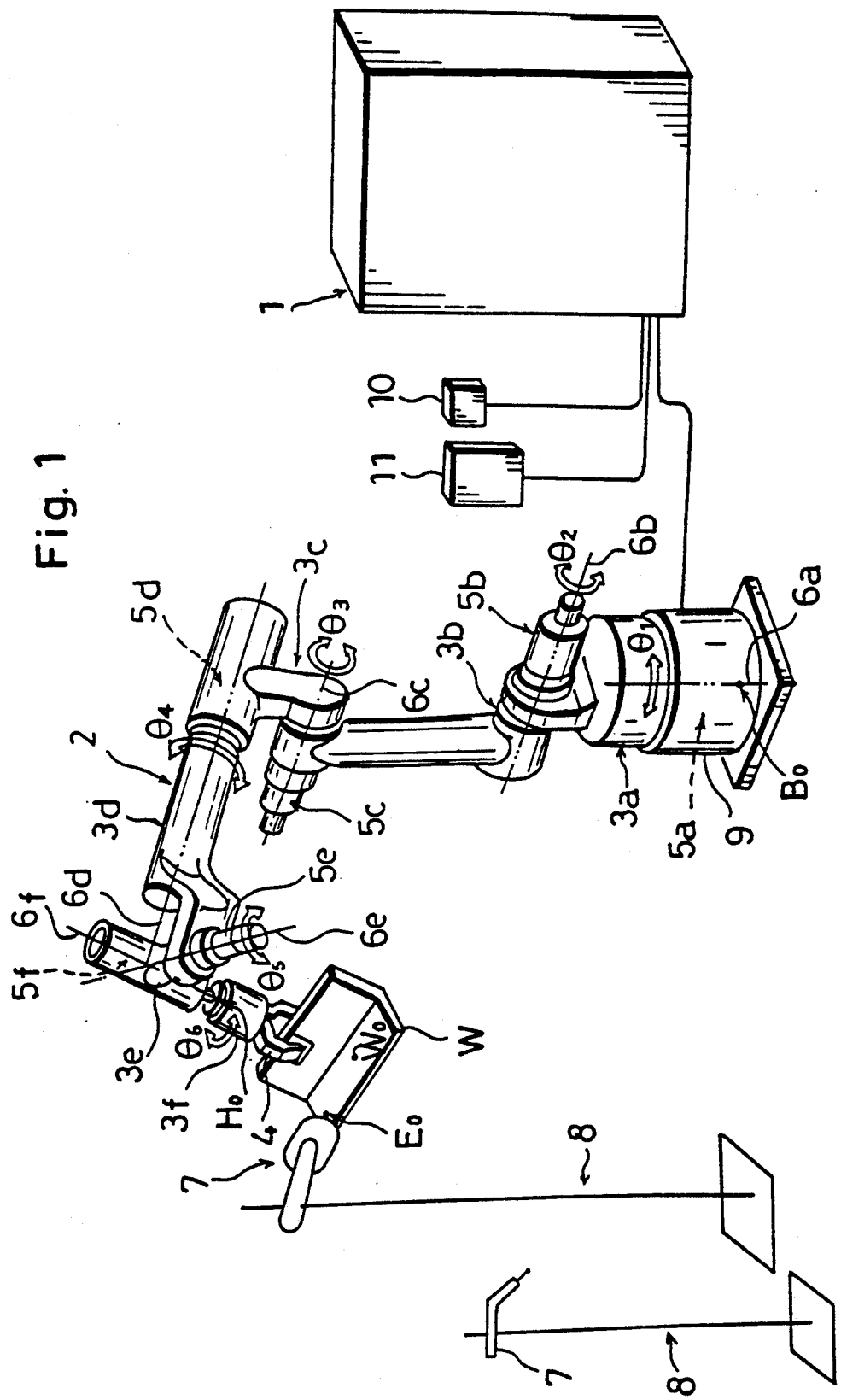
FIG. 1 is a perspective view showing a robot controlled by a control apparatus according to the present invention.

1. Description of the Overall Arrangement:

Referring first to FIG. 1, there is illustrated an industrial robot 2 which is controlled by a control apparatus 1 according to the present invention. The robot 2 has a base 9 fixed on a floor for example. Of course, the illustrated robot is only one example and therefore may be replaced by a different robot.

The robot 2 shown in FIG. 1 has six rotary joints (points of articulation) 3a-3f to provide six degrees of freedom. The free end joint 3f carries a hand 4 for holding a workpiece W which may be an object being welded for example. The respective joints 3a-3f are rotated about respective rotary axes 6a-6f by respective drive devices 5a-5f. Though not shown, each of the drive devices 5a-5f includes a reduction mechanism, a servomotor and a rotation detector (rotary encoder).

The workpiece W held by the robot 2 may be made to undergo various treatments provided by a plurality of tools 7. Each of the tools 7 is supported on a support 8 which is, in turn, fixed to the floor like the base 9 of the robot 2. The tool performs a predetermined treatment such as grinding, cutting or welding.

The control apparatus 1 is connected to an operating box 10 and a teach pendant 11. The operating box 10 is used for switching between a teaching mode and a playback mode and for starting the playback mode operation. The teach pendant 11 is used for manually operating the robot 2 and for entering, either in a on-line or off-line state, various data (e.g. setting data, teaching data and identifiers) which are needed for making task programs.

Figure 2:
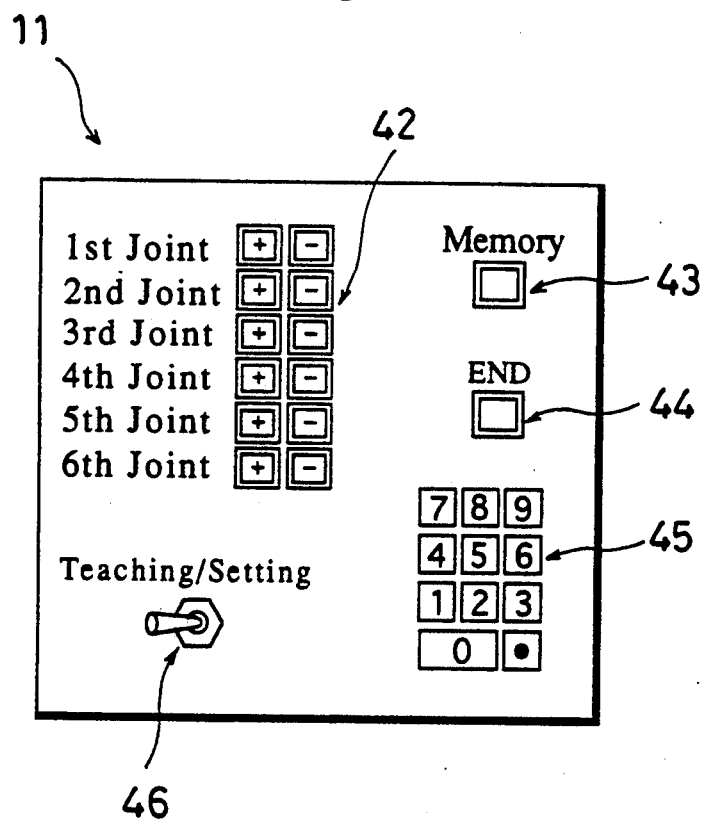
FIG. 2 is a plan view showing a teach pendant.

As shown in FIG. 2, the teach pendant 11 includes robot operation buttons 42 for manually operating the respective drive devices 5a-5f, a teaching point memory button 43, and an END button 44. The teach pendant further includes input keys 45 for entering the above-mentioned data (e.g. setting data, teaching data and identifiers), and a changeover switch 46 for selecting between a teaching-data input mode and a setting-data input mode.

Figure 3:
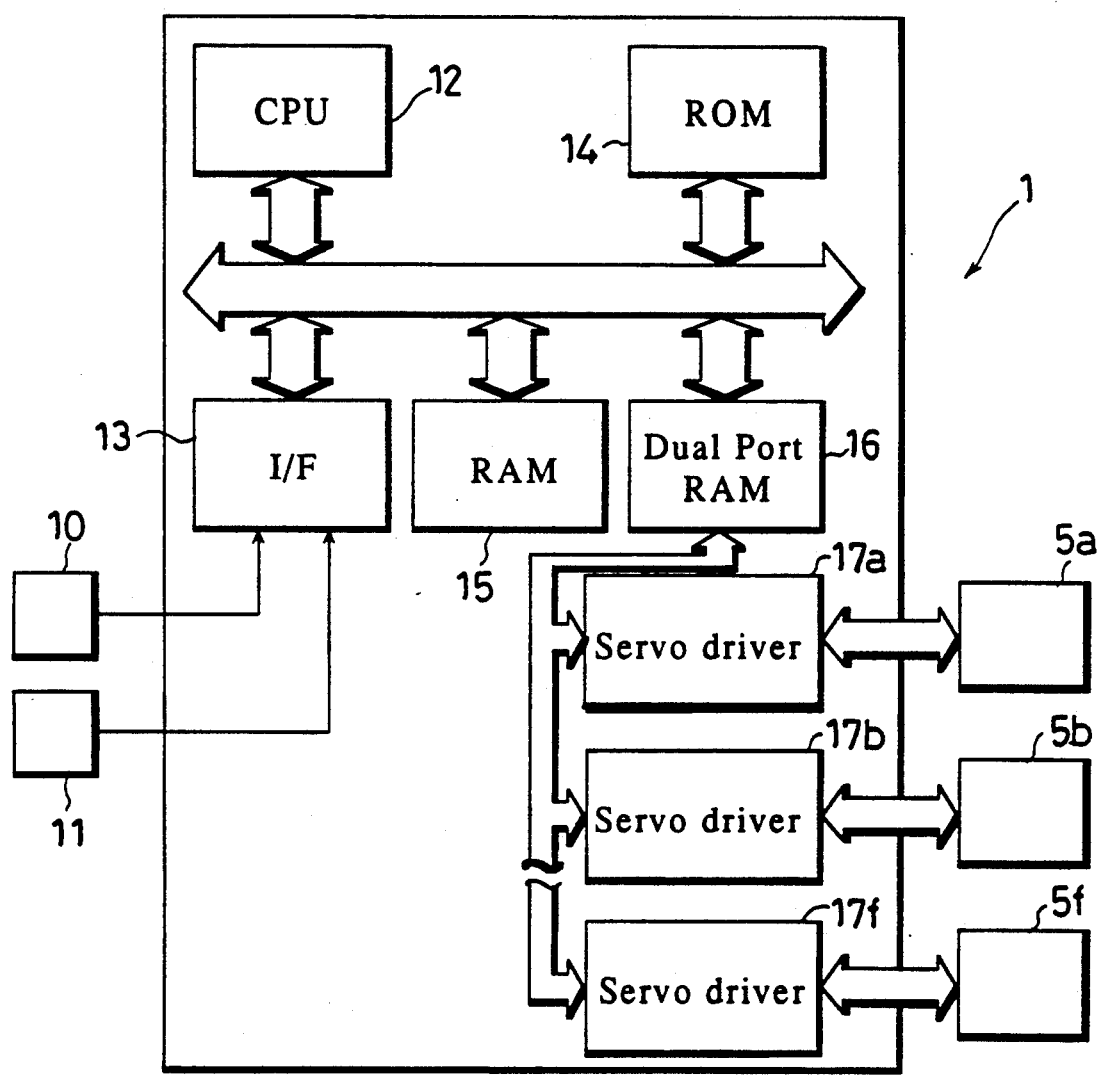
FIG. 3 is a block diagram showing a general electric arrangement of the control apparatus.

As shown in FIG. 3, the control apparatus 1 comprises a central processing unit (CPU) 12 which receives the input signals from the operating box 10 and the teach pendant 11 (FIG. 1) through an interface 13. On the basis of the calculation and control programs stored in a ROM (read only memory) 14, the CPU 12 generates various data and task programs for feeding to the the RAM (random access memory) 15. The CPU 12 also generates drive instruction data for the respective drive devices 5a-5f on the basis of the calculation programs stored in the ROM 14 and the task programs stored in the RAM 15. The drive instruction data thus generated are fed through a dual port RAM 16 for controlling servodrivers 17a–17f associated with the respective drive devices 5a–5f.

Figure 4:
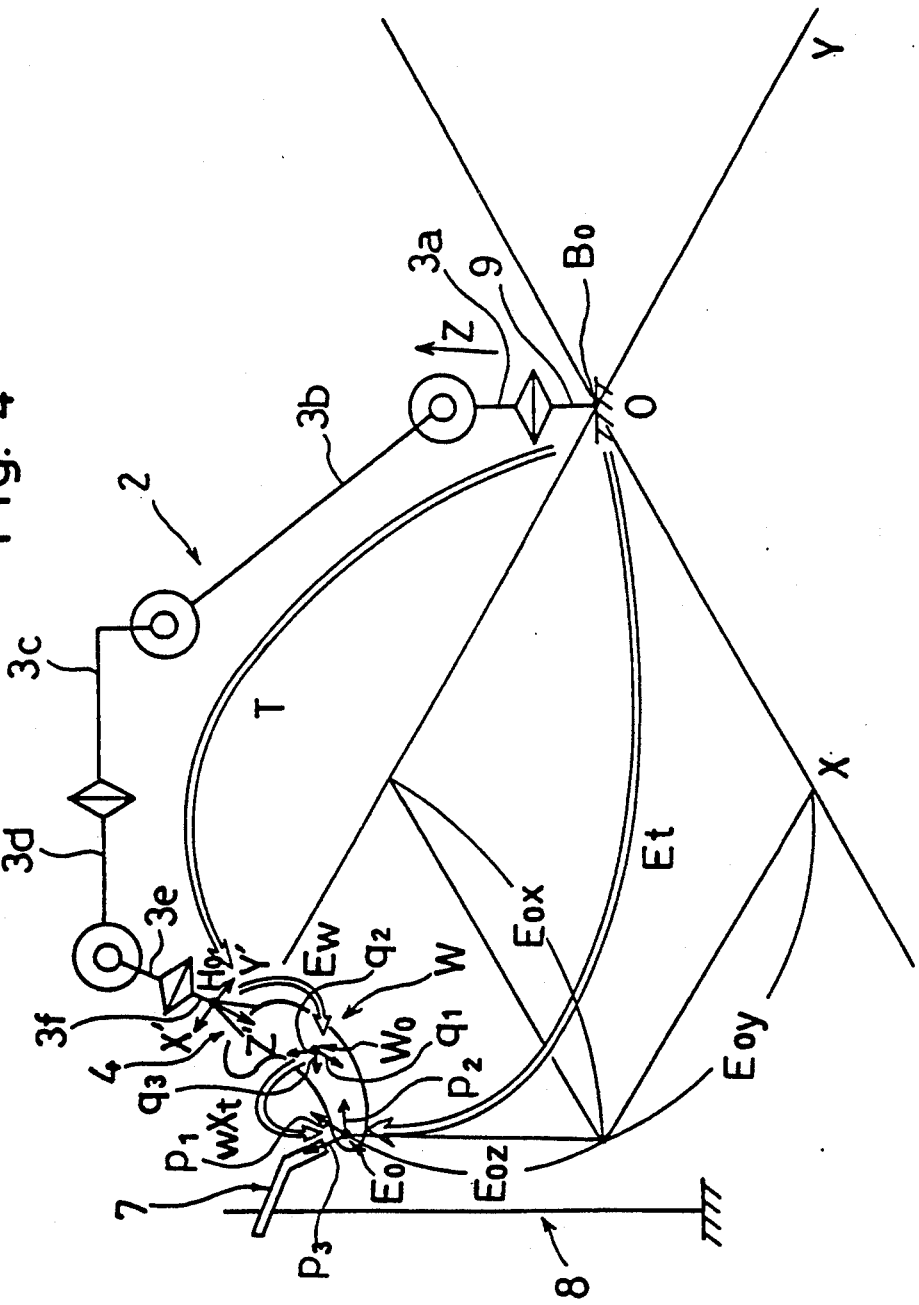
FIG. 4 is a schematic view showing the relationship in position and attitude between the robot, a tool and a workpiece.

Reference is now made to FIG. 4 which shows the positional and attitudinal relation between the robot 2, the workpiece W and each tool 7. For the convenience of explanation, only one tool 7 is shown in FIG. 4 relative to the robot 2 which is illustrated only schematically.

In FIG. 4, two different coordinate systems are taken which include a rectangular base coordinate system Bo-XYZ and a rectangular mechanical interface coordinate system Ho-X'Y'Z'. The base coordinate system Bo-XYZ is fixed relative to a reference point Bo of the robot base 9, whereas reference the mechanical interface coordinate system Ho-X'Y'Z' is fixed relative to a mechanical interface point Ho of the robot 2. Further, in FIG. 4, reference sign Eo represents the tip of the tool 7, whereas reference sign Wo designates a predetermined reference point Wo of the workpiece W.

Reference sign Et in FIG. 4 represents the positional and attitudinal relation of the tool tip Eo relative to the robot base reference point Bo, whereas reference sign Ew represents the positional and attitudinal relation of the workpiece reference point Wo relative to the mechanical interface point Ho. Similarly, reference sign T represents the positional and attitudinal relation of the mechanical interface point Ho relative to the robot base reference point Bo, whereas reference sign wXt designates the positional and attitudinal relation of the tool tip Eo relative to the workpiece reference point Wo. The respective relations Et, Ew, T, wXt are expressed in the following manner.

2. Description of Et:

The positional and attitudinal relation Et of the tool tip Eo relative to the base reference point Bo of the robot 2 is first described.

The attitude of the tool tip Eo in the base coordinate system Bo-XYZ may be represented by a set of three unit vectors $p_1$, $p_2$, $p_3$ fixed at the tool tip Eo. Each of the unit vectors $p_1$–$p_3$ are defined by three components extending along the respective XYZ-axes. For example, the unit vector $p_1$ may be defined by three components F1x (along the X-axis of the base coordinate system Bo-XYZ), F2x (along the Y-axis), F3x (along the Z-axis). Thus, the respective unit vectors $p_1$–$p_3$ can be expressed by the following formulas (1)–(3) when viewed in the base coordinate system.

$$p_1 = (F1x, F2x, F3x) \quad (1)$$

$$p_2 = (F1y, F3y) \quad (2)$$

$$p_3 = (F1z, F2z, F3z) \quad (3)$$

Further, the position vector BoEo of the tool tip Eo in the base coordinate system Bo-XYZ may be defined by the following formula (4) (see FIG. 4).

$$BoEo = (Eox, Eoy, Eoz) \quad (4)$$

Therefore, the positional and attitudinal relation Et of the tool tip Eo relative to the robot base reference point Bo can be expressed by the following matrix (5).

$$Et = \begin{pmatrix} F1x & F1y & F1z & Eox \\ F2x & F2y & F2z & Eoy \\ F3x & F3y & F3z & Eoz \\ 0 & 0 & 0 & 1 \end{pmatrix} \quad (5)$$

In the 4-row-4-column matrix (or 4 by 4 matrix or 4×4 matrix) of the formula (5), the upper left 3×3 partition represents the attitude of the tool tip Eo, whereas the 3-row-1-column vector (Eox, Eoy, Eoz)$^T$ at the upper right represents the position of the tool tip Eo relative to the robot base reference point Bo. It should be appreciated that the notation "()$^T$" means row-to-column transposition.

On the other hand, the positional and attitudinal relation Et of the tool tip Eo relative to the robot base reference point Bo can be also expressed by the following formula (6).

$$Et = \text{Trans}(Eox, Eoy, Eoz) \cdot Rot(X, \alpha x) \cdot Rot(Y, \alpha y) \cdot Rot(Z, \alpha z) \quad (6)$$

In the formula (6), the notation "Trans(Exo, Eyo, Ezo)" is a homogeneous transformation matrix (given in the formula (7) below) representing translational transformation of the tool tip Eo from the robot base reference point Bo. Each of the notations "Rot(X, $\alpha x$)", "Rot(Y, $\alpha y$)" and "Rot(Z, $\alpha z$)" is also a homogeneous transformation matrix (given in the formulas (8)–(10) below) representing rotation of the tool tip Eo about the X-axis (or Y-axis or Z-axis) of the base coordinate system Bo-XYZ through an angle $\alpha x$ (or $\alpha y$ or $\alpha z$).

$$\text{Trans}(Eox, Eoy, Eoz) = \begin{pmatrix} 1 & 0 & 0 & Eox \\ 0 & 1 & 0 & Eoy \\ 0 & 0 & 1 & Eoz \\ 0 & 0 & 0 & 1 \end{pmatrix} \quad (7)$$

$$Rot(X, \alpha x) = \begin{pmatrix} 1 & 0 & 0 & 0 \\ 0 & \cos\alpha x & -\sin\alpha x & 0 \\ 0 & -\sin\alpha x & \cos\alpha x & 0 \\ 0 & 0 & 0 & 1 \end{pmatrix} \quad (8)$$

$$Rot(Y, \alpha y) = \begin{pmatrix} \cos\alpha y & 0 & \sin\alpha y & 0 \\ 0 & 1 & 0 & 0 \\ -\sin\alpha y & 0 & \cos\alpha y & 0 \\ 0 & 0 & 0 & 1 \end{pmatrix} \quad (9)$$

$$Rot(Z, \alpha z) = \begin{pmatrix} \cos\alpha z & -\sin\alpha z & 0 & 0 \\ \sin\alpha z & \cos\alpha z & 0 & 0 \\ 0 & 0 & 1 & 0 \\ 0 & 0 & 0 & 1 \end{pmatrix} \quad (10)$$

According to the formula (6), the position of the tool tip Eo is expressed by the translation "Trans(Eox, Eoy, Eoz)", whereas the attitude of the tool tip Eo is given by the roll-pitch-yaw angle expression "Rot(X, $\alpha x$)·Rot(Y, $\alpha y$)·Rot(Z, $\alpha z$)". The product of the matrices contained the formula (6) is also a 4-row-4-column matrix which is equivalent to the matrix of the formula (5).

In the field of robotics, it is well-known to use 4-row-4-column matrices for transforming coordinate systems (as above), thereby describing the position and attitude of an object relative to a reference object.

3. Description of Ew:

The positional and attitudinal relation Ew of the workpiece reference point Wo relative to the mechanical interface point Ho of the robot 2 is next described.

The attitude of the workpiece reference point Wo in the mechanical interface coordinate system Ho-X'Y'Z' may be represented by a set of three unit vectors $q_1$, $q_2$, $q_3$ fixed at the workpiece reference point Wo. Each of the unit vectors $q_1$–$q_3$ are defined by three components along the respective X'Y'Z'-axes. For example, the unit vector $q_1$ may be defined by three components G1x (along the X'-axis of the coordinate system Ho-X'Y'Z'), G2x (along the Y'-axis), G3x (along the Z'-axis). Thus, the respective unit vectors $q_1$–$q_3$ can be expressed by the following formulas (11)–(13) when viewed in the mechanical interface coordinate system.

$$q_1 = (G1x, G2x, G3x) \tag{11}$$

$$q_2 = (G1y, G2y, G3y) \tag{12}$$

$$q_3 = (G1z, G2z, G3z) \tag{13}$$

Further, the position vector HoWo of the workpiece reference point Wo in the mechanical interface coordinate system Ho-X'Y'Z' may be defined by the following formula (14).

$$H_{oWo} = (Wox, Woy, Woz) \tag{14}$$

Therefore, the positional and attitudinal relation Ew of the workpiece reference point Wo relative to the mechanical interface point Ho can be expressed by the following matrix (15).

$$Ew = \begin{pmatrix} G1x & G1y & G1z & Wox \\ G2x & G2y & G2z & Woy \\ G3x & G3y & G3z & Woz \\ 0 & 0 & 0 & 1 \end{pmatrix} \tag{15}$$

On the other hand, the positional and attitudinal relation Ew of the workpiece reference point Wo relative to the mechanical interface point Ho can be also expressed by the following formula (16).

$$Ew = Trans(Wox, Woy, Woz) \cdot Rot(X', \beta x) \cdot Rot(Y', \beta y) \cdot Rot(Z', \beta z) \tag{16}$$

The meaning of the formula (16) is similar to that of the formula (6). Again, the product of the matrices contained in the formula (16) is also a 4-row-4-column matrix which is equivalent to the matrix of the formula (15).

4. Description of T:

Since the robot 2 has a plurality of joints, the positional and attitudinal relation T of the mechanical interface point Ho of the robot 2 relative to the base reference point Bo can be conveniently expressed by the so-called "Denavit-Hartenberg notation" (hereafter referred to as "DH Notation"). The DH notation is fully described in "ROBOT MANIPULATORS" (Written by R. P. Paul: Published by MIT Press in 1981). For the convenience of explanation, the DH notation is described below with reference to FIGS. 5 and 6.

Figure 5:
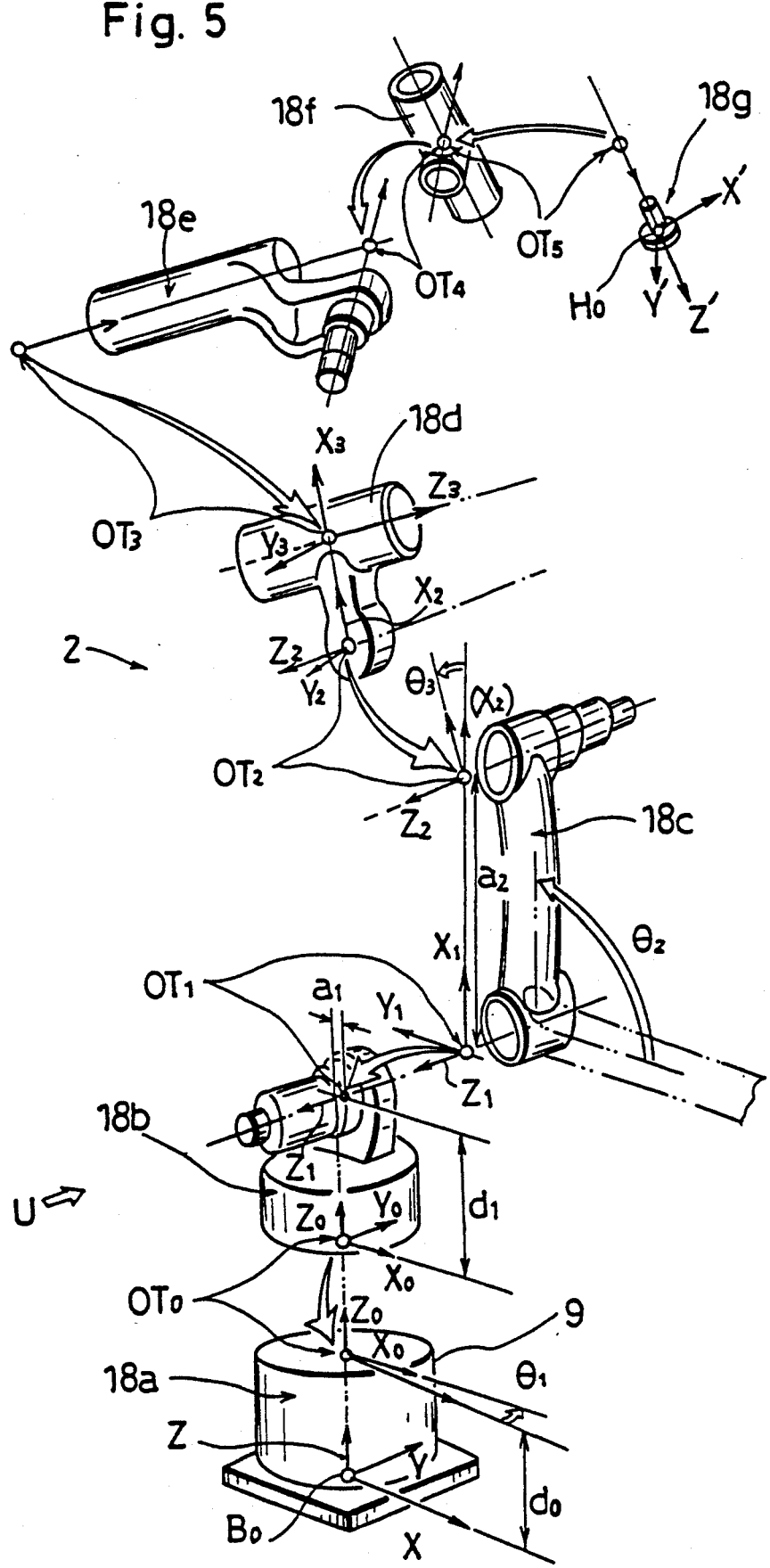
FIG. 5 is an exploded perspective view showing the relationship between various links of the robot.
Figure 6:
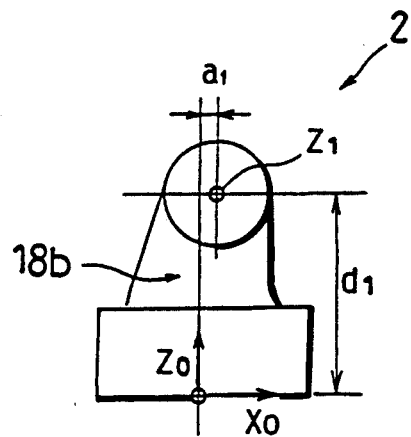
FIG. 6 is a fragmentary side view showing a first link of the robot as seen in the direction of an arrow U in FIG. 5.

As shown in FIGS. 5 and 6, the robot 2 is assumed to have a base link 18a and first to sixth links 18b–18g. Besides the base coordinate system Bo-XYZ and the mechanical interface coordinate system Ho-X'Y'Z', different coordinate systems $OT_0$-$X_0Y_0Z_0$ to $OT_5$-$X_5Y_5Z_5$ are systematically related to the respective links.

According to the DH notation, the relation An between each two successive coordinate systems is expressed by the following formula (17).

$$An = Rot(Z, \theta n) \cdot Trans(0, 0, dn) \cdot Trans(an0, 0) \cdot Rot(X, \alpha n) \tag{17}$$

The parameters $\theta n$, $dn$, $an$ and $\alpha n$ contained in the formula (17) are determined for the respective links 18a–18g in the following manner.

First, at the base link 18a, since the $Z_0$-axis of the first link 18b extends in the same direction as the Z-axis of the base link 18a, a rotational angle $\alpha n$ about the X-axis is 0.0. Further, the coordinate system origin $OT_0$ of the first link 18b is spaced from the base reference point Bo of the base link 18a by an amount $dn = d_0$ in the Z-axis direction and by an amount $an = 0.0$ in the X-axis direction. Moreover, $\theta n$ at the base link 18a, namely $\theta_0$ which is initial rotation of the first link 18b about the Z-axis, is zero (0.0). Note that the subsequent rotation of the first link 18b about the Z-axis is taken into consideration in the next step, as described below.

At the first link 18b, the $Z_1$-axis of the second link 18c is rotationally displaced from the $Z_0$-axis of the first link 18b by an angle $\alpha n = +\pi/2$ about the $X_0$-axis of the first link 18b. Further, the coordinate system origin $OT_1$ of the second link 18c is spaced from the coordinate system origin $OT_0$ of the first link 18b by an amount $dn = d_1$ in the $Z_0$-axis direction and by an amount $an = a_1$ in the $X_0$-axis direction (see FIG. 6). Moreover, the first link 18b is rotated relative to the base link 18a by $\theta n = \theta_1$ about the $Z_0$-axis (FIGS. 1 and 4).

At the second link 18c, the $Z_2$-axis of the third link 18d is parallel to the $Z_1$-axis of the second link 18c, hence $\alpha n = 0.0$. Further, the coordinate system origin $OT_2$ of the third link 18d is spaced from the coordinate system origin $OT_1$ of the second link 18c by an amount $dn = 0.0$ in the $Z_1$-axis direction and by an amount $an = a_2$ in the $X_1$-axis direction. Moreover, the second link 18c is rotated relative to the first link 18b by $\theta n = \theta_2$ about the $Z_1$-axis (see also FIG. 1).

The parameters $\theta n$, $dn$, $an$ and $\alpha n$ for the third to sixth links 18d–18g are listed in the following table 1 together with those already described. Of these parameters, $\theta n$ alone can be changed by means of the drive devices 5a–5f (FIG. 1) and is therefore called "joint variable".

TABLE 1

| No. | Likn | $\theta n$ | an | dn | $\alpha h$ |
|---|---|---|---|---|---|
| 0 | Base Link | 0.0 | 0.0 | $d_0$ | 0.0 |
| 1 | 1st Link | $\theta_1$ | $a_1$ | $d_1$ | $+\pi/2$ |
| 2 | 2nd Link | $\theta_2$ | $a_2$ | 0.0 | 0.0 |
| 3 | 3rd Link | $\theta_3$ | $a_3$ | 0.0 | $+\pi/2$ |
| 4 | 4th Link | $\theta_4$ | 0.0 | $d_4$ | $+\pi/2$ |
| 5 | 5th Link | $\theta_5$ | 0.0 | 0.0 | $-\pi/2$ |
| 6 | 6th Link | $\theta_6$ | 0.0 | $d_6$ | 0.0 |

For the ith link, the formula (17) may be rewritten, as follows.

$$Ai = Rot(Z, \theta i) \cdot Trans(ai, 0, dn) \cdot Rot(X, \alpha i) \tag{18}$$

The positional and attitudinal relation T (FIG. 4) of the mechanical interface point Ho of the robot 2 relative to the base reference point Bo of the robot 2 is obtained by taking the product of Ai for the respective links 18a–18g, as indicated by the following equation (19).

$$T = A0 \cdot A1 \cdot A2 \cdot A3 \cdot A4 \cdot A5 \cdot A6 \tag{19}$$

Since each of the elements contained in both of the formulas (18) and (19) is a 4-row-4-column matrix, the product obtained by the formula (19) is also a 4-row-4-column matrix. The resulting product matrix is given in the following formula (20).

$$T = \begin{pmatrix} X1x & X1y & X1z & Rx \\ X2x & X2y & X2z & Ry \\ X3x & X3y & X3z & Rz \\ 0 & 0 & 0 & 1 \end{pmatrix} \tag{20}$$

5. Description of wXt:

Then, the positional and attitudinal relation wXt of the tool tip Eo relative to the workpiece reference point Wo is described with reference to FIG. 7.

In substantially the same manner as already described with respect to Et (FIG. 4), the positional and attitudinal relation wXt of the tool tip Eo relative to the workpiece reference point Wo is also expressed by the following formula (21) which is similar to the formula (6) for calculating Et.

$$wXt = \text{Trans}(Sx, Sy, Sz) \cdot \text{Rot}(X, \theta x) \cdot \text{Rot}(Y, \theta y) \cdot \text{Rot}(Z, \theta z) \tag{21}$$

The respective notations "Trans(Sx, Sy, Sz)" "Rot(X, $\theta$x)", "Rot(Y, $\theta$y)" and "Rot(Z, $\theta$z)" contained in the formula (21) correspond to the notations used in the formula (6), so that they represent a 4-row-4-column transformation matrix, as expressed by the formulas (22)–(25) below. Note that the parameters used in the formula (21) are shown in FIG. 7 except for $\theta$x and $\theta$z which can be easily inferred from the illustrated parameter $\theta$y.

$$\text{Trans}(Sx, Sy, Sz) = \begin{pmatrix} 1 & 0 & 0 & Sx \\ 0 & 1 & 0 & Sy \\ 0 & 0 & 1 & Sz \\ 0 & 0 & 0 & 1 \end{pmatrix} \tag{22}$$

$$\text{Rot}(X, \theta x) = \begin{pmatrix} 1 & 0 & 0 & 0 \\ 0 & \cos\theta x & -\sin\theta x & 0 \\ 0 & -\sin\theta x & \cos\theta x & 0 \\ 0 & 0 & 0 & 1 \end{pmatrix} \tag{23}$$

$$\text{Rot}(Y, \theta y) = \begin{pmatrix} \cos\theta y & 0 & \sin\theta y & 0 \\ 0 & 1 & 0 & 0 \\ -\sin\theta y & 0 & \cos\theta y & 0 \\ 0 & 0 & 0 & 1 \end{pmatrix} \tag{24}$$

$$\text{Rot}(Z, \theta z) = \begin{pmatrix} \cos\theta z & -\sin\theta z & 0 & 0 \\ \sin\theta z & \cos\theta z & 0 & 0 \\ 0 & 0 & 1 & 0 \\ 0 & 0 & 0 & 1 \end{pmatrix} \tag{25}$$

According to the formula (21), the position of the tool tip Eo is expressed by the translation "Trans(Sx, Sy, Sz)", whereas the attitude of the tool tip Eo is given by the roll-pitch-yaw angle expression "Rot(X, $\theta$x)·Rot(Y, $\theta$y)·Rot(Z, $\theta$z)". The product of the matrices contained the formula (21) is also a 4-row-4-column matrix which is given by the following formula (26).

$$wXt = \begin{pmatrix} M1x & M1y & M1z & Sx \\ M2x & M2y & M2z & Sy \\ M3x & M3y & M3z & Sz \\ 0 & 0 & 0 & 1 \end{pmatrix} \tag{26}$$

6. Correlation between Et, Ew, T and wXt:

As described above, all of Et, Ew, T and wXt are equally represented by a 4-row-4-column matrix. Thus, by referring to FIG. 4, it is clearly understood that the following equation (27) is applicable.

$$Et = T \cdot Ew \cdot wXt \tag{27}$$

By using the equation (27), it is possible to determine T if Et, Ew and wXt are known. It is also possible to determine wXt if Et, Ew and T are known.

7. Description of First Embodiment:

Having described the background items necessary for conveniently understanding the present invention, the first embodiment of the present invention is now described.

Figure 8:
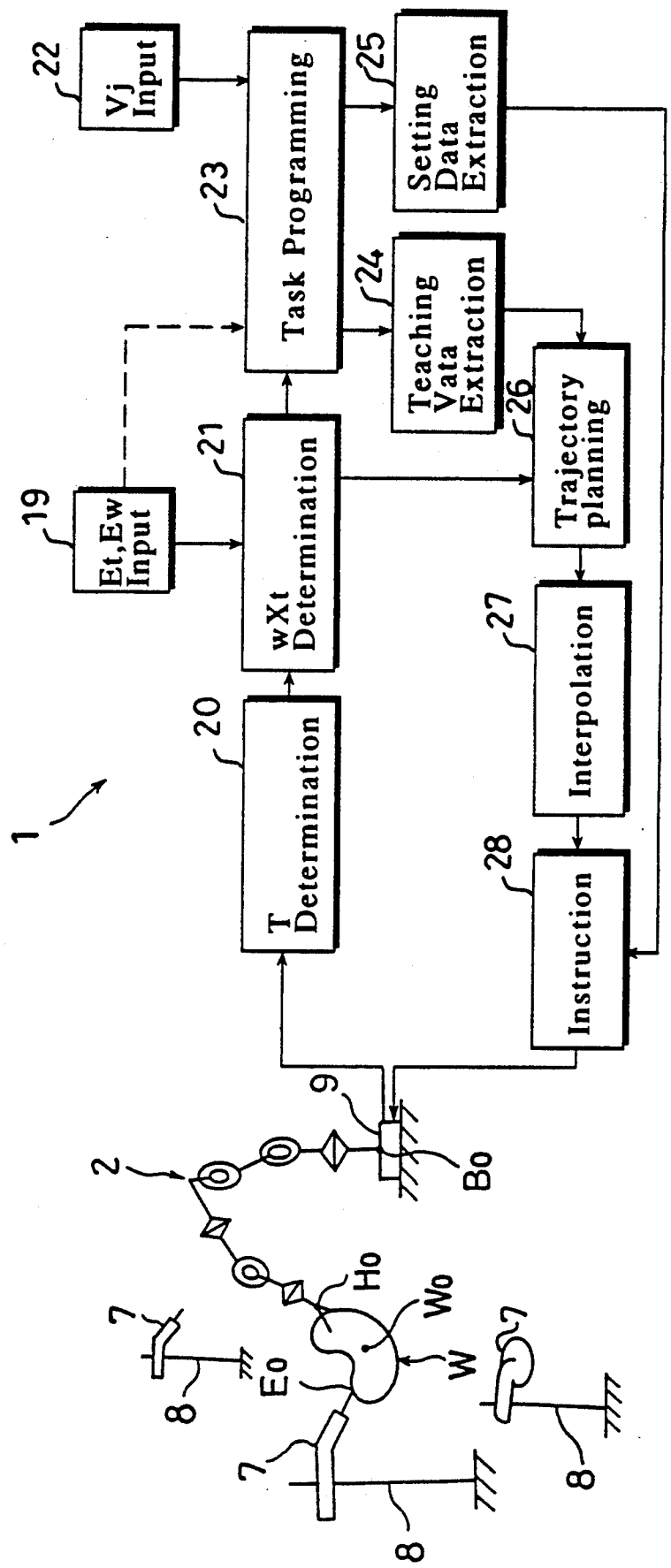
FIG. 8 is a control block diagram according to a first embodiment of the present invention.

Referring to FIG. 8, the control apparatus 1 of the first embodiment comprises a setting data input means 19 for entering the positional and attitudinal relation Et of the tool tip Eo relative to the base reference point Bo of the robot 2, and the positional and attitudinal relation Ew of the workpiece reference point Wo relative to the mechanical interface point Ho of the robot 2, The data entry may be performed by using the input keys 45 of the teach pendant 11 (see FIGS. 1 and 2).

The control apparatus 1 also comprises a T determination means 20 for determining the positional and attitudinal relation T of the robot mechanical interface point Ho relative to the base reference point Bo of the robot 2. For this purpose, the T determination means 20 receives information about the joint variable $\theta$n (see FIGS. 1 and 5) at each of the rotary joints 3a–3f.

The relation T determined at the T determination means 20 together with the relations Et and Ew entered at the setting data input means 19 is fed to a wXt determination means 21 for calculating the positional and attitudinal relation wXt, of the tool tip Eo relative to the workpiece reference point Wo. Such calculation is performed on the basis of the equation (27). The notation "wXt" with the suffix "j" means that the "wXt" data is taken at the "jth" teaching point, and the same suffix is also used in the following description to specify the teaching point.

Reference numeral 22 in FIG. 8 designates a speed input means for entering the translational speed v<sub>j</sub> of the workpiece W relative to the tool 7.

A task programming means 23 generates a plurality of teaching data which include the translational speed $v_j$ entered at the speed input means 22 and the $wXt_j$ data calculated at the wXt determination means 21. The task programming means 23 also prepares a task program on the basis of the teaching data and the Et-Ew setting data entered at the setting data input means 19, and stores the thus prepared task program.

A teaching data extraction means 24 successively takes out the teaching data from the task program made at the task programming means 23, whereas a setting date extraction means 25 takes the setting data (Et and Ew) from the task program.

A trajectory planning means 26 receives the teaching data from the teaching data extraction means 24 for planning a trajectory for the workpiece W (namely, the mechanical interface point Ho of the robot 2) relative to the tool 7.

An interpolation means 27 interpolates the trajectory planned by the trajectory planning means 24 between each two adjacent teaching points. The interpolation means 27 also calculates the positional and attitudinal relation $wXt_{j,\,i}$ of the tool tip relative to the workpiece reference point Wo at each interpolation point. The notation "$wXt_{j,\,i}$" means that the interpolation data is taken at the "ith" interpolation point following the "jth" teaching point, and the same notation is also used in the following description to specify the interpolation point.

An instruction means 28 calculates a required value of the joint variable $\theta n$ (namely, the movement of the robot 2) on the basis of the $wXt_{j,\,i}$ calculated by the interpolation means 27, and gives corresponding instructions to the drive devices $5a$–$5f$ (FIG. 1) of the robot 2.

Next, the operation of the control apparatus 1 according to the first embodiment is described starting from the teaching procedure.

Figure 9:
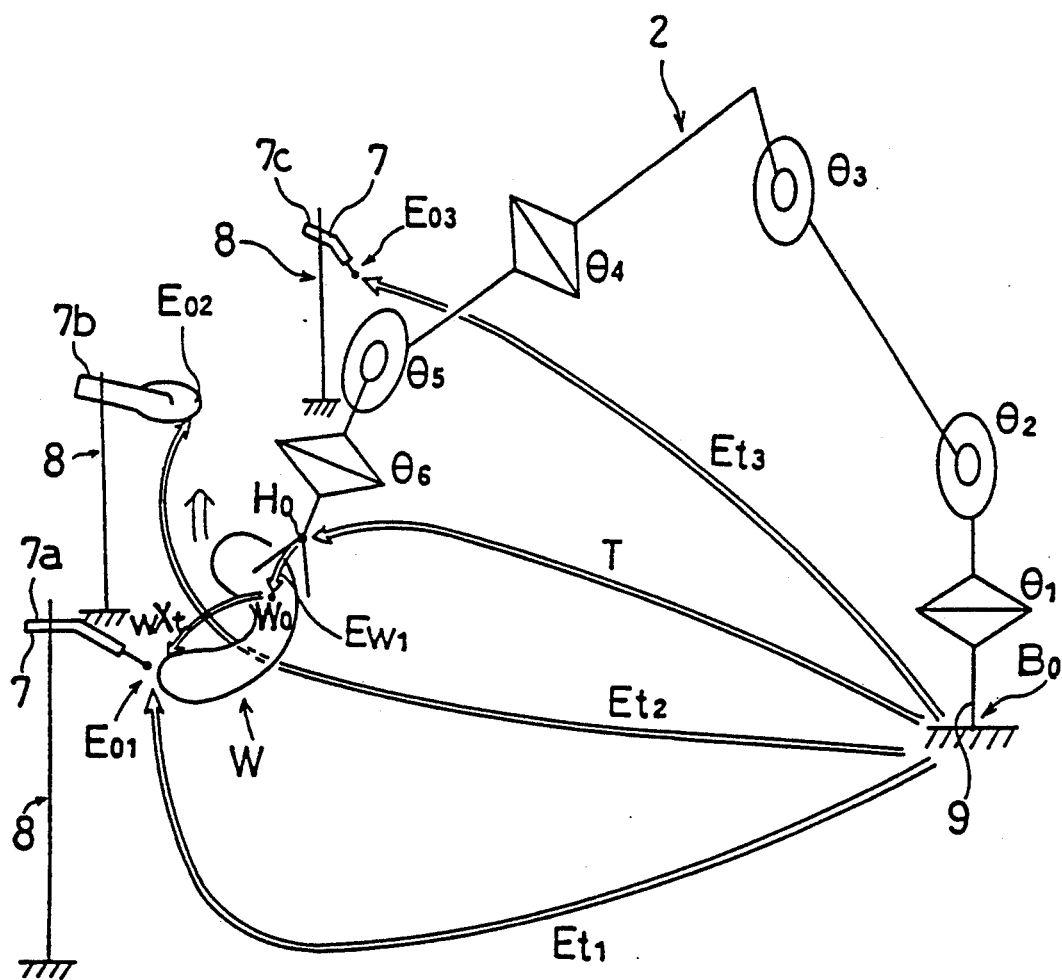
FIG. 9 is a schematic view similar to FIG. 4 but showing the relationship in position and attitude between the robot, a plurality of tools and a workpiece.

In FIG. 9, the robot 2 is designed to act on a selected one of three tools $7a$, $7b$, $7c$. It is now assumed that two tools $7a$, $7c$ are designed to perform the same kind of task (welding for example), whereas the other tool $7b$ performs a different kind of task (grinding for example). It is further assumed that the teaching procedure is first performed with respect to the tool $7a$. This first teaching procedure is illustrated in the flow diagram of FIG. 10.

Figure 10:
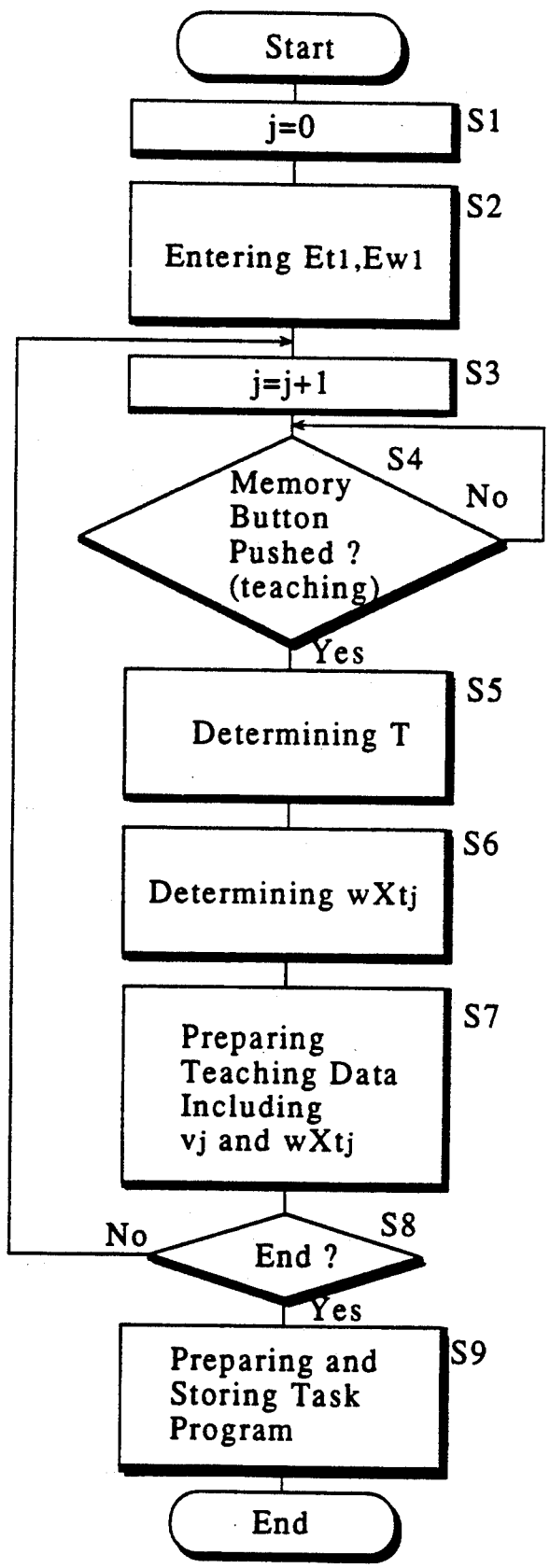
FIG. 10 is a flow chart showing the teaching procedure performed according to the first embodiment.

As shown in FIG. 10, in S1 (S being the abbreviation of "Step"), the numeral zero (0) is entered as the serial number j of the teaching data.

In S2, the positional and attitudinal relation Et ($Et_1$) of the tool tip Eo ($Eo_1$) relative to the base reference point Bo as well as the positional and attitudinal relation Ew ($Ew_1$) of the workpiece reference point Wo relative to the mechanical interface point Ho is supplied from the setting data input means 19 (see FIG. 8) by using the teach pendant 11 (see FIG. 2).

In S3, j is increased by one (1) to be ready for making the teaching data.

In S4, the robot 2 holding the workpiece W is manually manipulated by using the robot operation buttons 42 (see FIG. 2) to a desired position for teaching. Then, the teaching point memory button 43 (FIG. 2) of the teach pendant 11 is pushed to store the present position (teaching point).

In S5, the joint variables ($\theta_1$–$\theta_6$) of the robot 2 are detected for determining the positional and attitudinal relation T of the mechanical interface point Ho relative to the base reference point Bo. Such determination can be done at the T determination means 20 (see FIG. 8) by performing calculation in accordance with the formulas (18)–(20).

In S6, the wXt determination means 21 (see FIG. 8) is caused to calculate the positional and attitudinal relation $wXt_j$ of the tool tip $Eo_1$ relative to the workpiece reference point Wo by using the following equation (28).

$$wXt_j = (T \cdot Ew_1)^{-1} \cdot Et_1 \qquad (28)$$

As can be easily understood, the equation (28) corresponds to equation (27) which is a more general expression. Specifically, the $Et_1$ and $Ew_1$ of the equation (28) correspond to the Et and Ew, respectively, of the equation (27). The notation "$(T \cdot Ew_1)^{-1}$" means the inverse matrix of $(T \cdot Ew_1)$.

In S7, the translational speed $v_j$ of the workpiece W relative to the tool $7a$ is numerically entered from the speed input means 22 (see FIG. 8) by using the teach pendant (see FIG. 2). Further, the task programming means 23 (FIG. 8) is caused to prepare and store a teaching data including $v_j$ and $wXt_j$.

The above steps S3–S7 are repeated successively with respect to a require number of teaching points. Thereafter, in S8, the END button 44 (see FIG. 2) of the teach pendant 11 is pressed to terminate the teaching procedure.

In S9, the task programming means 23 (FIG. 8) is caused to prepare and store a task program which includes a series of teaching data together with the setting data.

Figure 11:
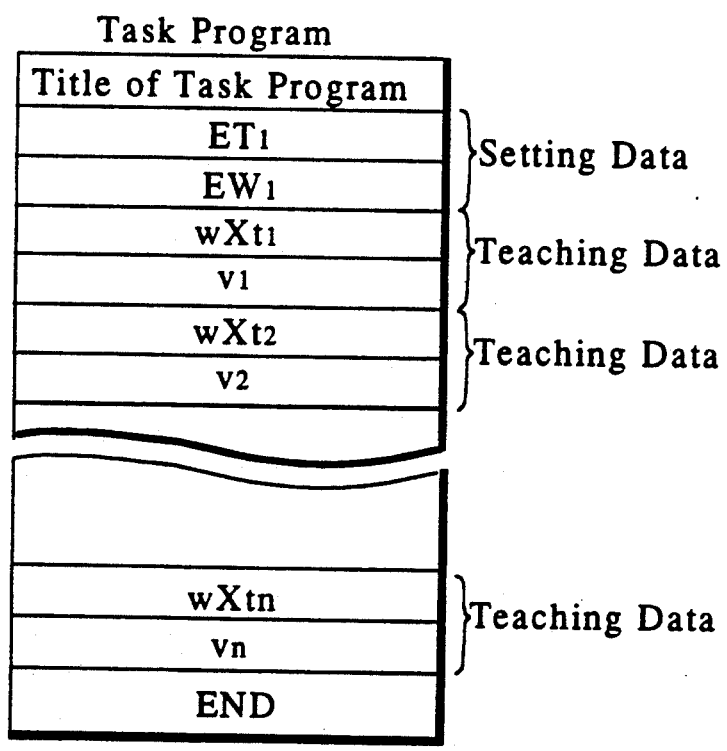
FIG. 11 is a view showing the content of the task program prepared according to the first embodiment.

FIG. 11 shows the content of the task program thus prepared. It is important for the present invention that the task program itself includes the setting data ($Et_1$ and $Ew_1$) in addition to the teaching data. It is also significant for the present invention that the teaching data include the positional and attitudinal relation $wXt_j$ of the tool tip $Eo_1$ relative to the workpiece reference point Wo, as opposed to the prior art wherein the teaching data only include the positional and attitudinal relation T of the tool tip relative to the base reference point. The technical advantages of having such a task program will be described later.

Next, the playback procedure for the first embodiment is described with reference to the flow diagram of FIG. 12.

In S50, the numeral zero (0) is entered as the serial number of the teaching data.

In S51, the setting data extraction means 25 (FIG. 8) is caused to read out, from the task program, the positional and attitudinal relation $Et_1$ of the tool tip $Eo_1$ relative to the base reference point Bo as well as the positional and attitudinal relation $Ew_1$ of the workpiece reference point Wo relative to the mechanical interface point Ho.

In S52, the present joint variables ($\theta_1$–$\theta_6$) of the robot 2 are detected for determining the positional and attitudinal relation T of the mechanical interface point Ho relative to the base reference point Bo according to the formulas (18)–(20). Further, the wXt determination means 21 (see FIG. 8) is caused to calculate the positional and attitudinal relation $wXt_j$, at the present instance, of the tool tip $Eo_1$ relative to the workpiece reference point Wo according to the equation (28). The $wXt_j$ thus obtained is used as a starting point for subsequent interpolation.

In S53, the wXt$_{j+1}$ at the (j+1)th teaching point is taken out from the task program as a target point for the interpolation.

In S54, the unit displacement Δu (including both of the moving distance and the moving direction) for each interpolation interval or path segment, the number n$_{j+1}$ of interpolation points and the time t$_{j+1}$ required for interpolation are determined in the following manner.

Now, the position component L$_j$ of wXt$_j$ of the jth teaching data is defined by the following formula (29).

$$L_j = (Sx_j, Sy_j, Sz_j)^T \quad (29)$$

Figure 7:
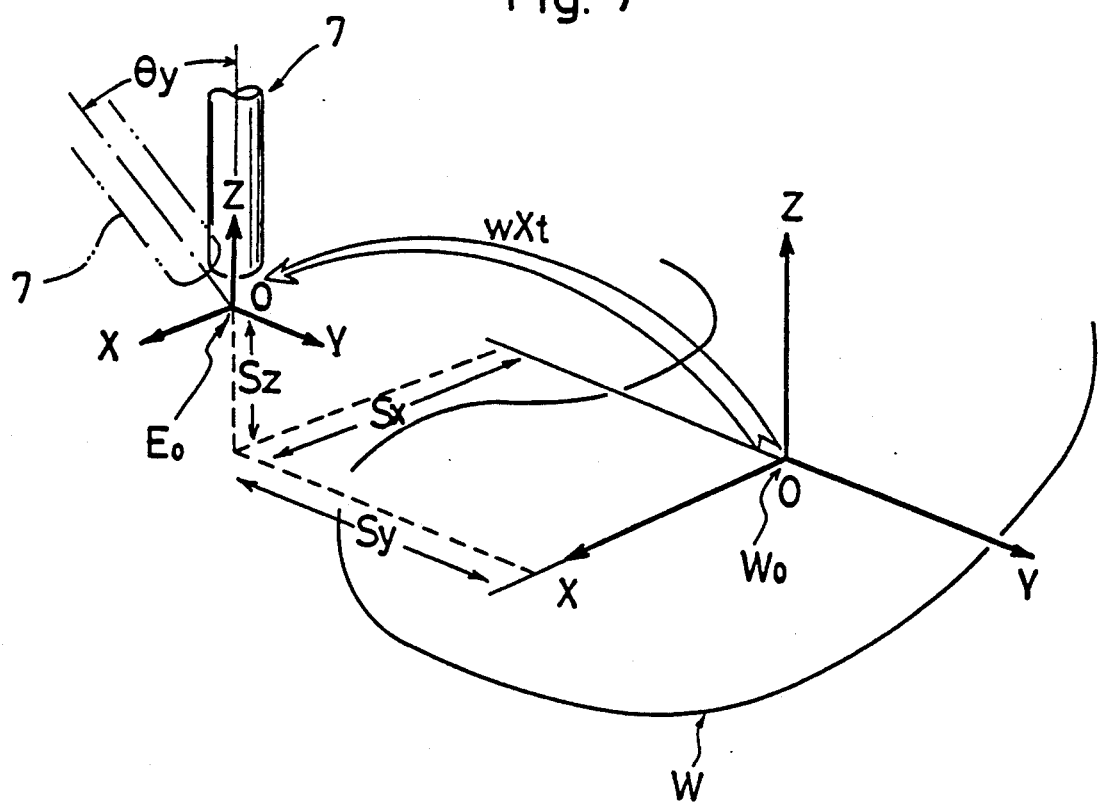
FIG. 7 is a schematic view illustrating the relationship in position and attitude between the tool and the workpiece.

Note that $(Sx_j, Sy_j, Sz_j)^T$ contained in the formula (29) corresponds to the fourth column vector of the wXt matrix contained in the formula (26) (see also FIG. 7). Similarly to L$_j$, the position component L$_{j+1}$ of wXt$_{j+1}$ of the wXt$_{j+1}$ of the (j+1)th teaching data is defined by the following formula (30).

$$L_j = (Sx_{j+1}, Sy_{j+1}, Sz_{j+1})^T \quad (30)$$

The difference between the formulas (29) and (30) gives a vector extending from the jth teaching point to the (j+1)th teaching point. Dividing this vector by its own length gives a normalized value Δh which is represented by the following formula (31).

$$\Delta h = (L_{j+1} - L_j)/||L_{j+1} - L_j|| \quad (31)$$

In the formula (31), the notation "$||L_{j+1}-L_j||$" means an operator representing the length of the vector. The Δh obtained by the formula (31) is a vector representing the direction of translation, and the magnitude of Δh is unity (1). Thus, the translational displacement is obtained if Δh is multiplied by the moving distance.

If the interpolation pitch (namely, the time for each interpolation interval) is represented by t$_0$ while the translational speed is represented by V$_{j+1}$, the moving distance for each interpolation interval is given by V$_{j+1}$·t$_0$. Thus, the unit displacement Δu for each interpolation interval is calculated according to the following formula (32).

$$\Delta u = v_{j+1} \cdot t_0 \cdot \Delta h = (u1, u2, u3)^T \quad (32)$$

The number of interpolation points is obtained if the distance between the starting and target points is divided by the unit moving distance per each interpolation interval, as indicated by the following formula (33).

$$n_{j+1} = ||L_{j+1}-L_j||/(V_{j+1} \cdot t_0) \quad (33)$$

Further, the required time t$_{j+1}$ is given if the distance between the starting and target points is divided by the moving speed, as indicated by the following formula (34).

$$t_{j+1} = ||L_{j+1}-L_j||/v_{j+1} \quad (34)$$

Next, in S55, the attitudinal change of the tool 7a relative to the workpiece W is determined at each of the translational interpolation points. For interpolation between the jth and (j+1)th interpolation points, this attitudinal change may be calculated as rotation through an angle β about a certain axis Kr in accordance with the following formula (35).

$$Rot(Kr,\beta) = \begin{pmatrix} M1x_{j+1} & M1y_{j+1} & M1z_{j+1} & 0 \\ M1x_{j+1} & M1y_{j+1} & M1z_{j+1} & 0 \\ M1x_{j+1} & M1y_{j+1} & M1z_{j+1} & 0 \\ 0 & 0 & 0 & 1 \end{pmatrix} \cdot \begin{pmatrix} M1x_j & M1y_j & M1z_j & 0 \\ M1x_j & M1y_j & M1z_j & 0 \\ M1x_j & M1y_j & M1z_j & 0 \\ 0 & 0 & 0 & 1 \end{pmatrix}^{-1} \quad (35)$$

For determining the Kr and β, the formula (35) may be also rewritten as the following formula (36).

$$Rot(Kr,\beta) = \begin{pmatrix} nx & ox & cx & 0 \\ ny & oy & cy & 0 \\ nz & oz & cz & 0 \\ 0 & 0 & 0 & 1 \end{pmatrix} \quad (36)$$

The axis Kr provisionally used as the rotational center axis is a vector having an X-component Krx, a Y-component Kry and a Z-component Krz. Krx, Kry, Krz and β may be calculated in the following way.

$$\begin{cases} \beta = \cos^{-1}\{(nx + oy + cz - 1)/2\} \\ \text{where } 0 \leq \beta \leq \pi \\ Krx = (oz - cz)/(2\sin\beta) \\ Kry = (cx - nz)/(2\sin\beta) \\ Krz = (ny - ox)/(2\sin\beta) \end{cases} \quad (37)$$

Division of β by the number of interpolation points gives a rotational angle Δβ for each interpolation interval, as indicated in the following formula (38).

$$\Delta\beta = \beta/n_{j+1} \quad (38)$$

In S56, the numeral zero (0) is entered as the present serial number i of the interpolation points.

In S57, i is increased by one (1).

In S58, the lapsed time is calculated according to the following formula (39).

$$t_j = i \cdot t_0 \quad (39)$$

In S59, the positional and attitudinal relation wXt$_{j,i}$ of the tool tip Eo$_i$ relative to the workpiece reference point Wo at time t$_i$ is calculated in the following way.

As previously described, the translational displacement for each interpolation interval is given by Δu = (u1, u2, u3), whereas the attitudinal change for each interpolation interval is defined as rotation through an angle Δβ about the axis Kr. Thus, the present wXt$_{j,i}$ may be calculated by using the previous wXt$_{j,i-1}$ as indicated by the following equation (40).

$$wXt_{j,i} = wXt_{j,j-1} \cdot Trans(u1, u2, u3) \cdot Rot(Kr, \Delta\beta) \quad (40)$$

Further, the following equation (41) is applicable at the ith interpolation point.

$$Et_1 = T \cdot Ew_1 \cdot wXt_{j,i} \quad (41)$$

In S60, the target positional and attitudinal relation T of the mechanical interface point Ho relative to the base reference point Bo of the robot 2 is calculated on the basis of the equation (41). Specifically, the relation T can be obtained if both sides of the equation (41) is multiplied by the inverse matrix of $Ew_1 \cdot wXt_{j,i}$, as shown in the following formula (42).

$$T = Et_1 \cdot (Ew_1 \cdot wXt_{j,i})^{-1} \qquad (42)$$

In S61, the joint variables ($\theta_1$–$\theta_6$) of the robot 2 are calculated to realize the target T. Such calculation of the joint variables may be performed by the so-called "inverse kinematics" which is described in "ROBOTICS" (Written by John J. Craig: Published by Kyoritsushuppan Kabushiki Kaisha in 1981).

In S62, the joint variables ($\theta_1$–$\theta_6$) calculated in S61 are converted to drive instruction data for the servomotors of the respective drive devices $5a$–$5f$ (see FIG. 1). Upon lapse of $t_i$, the drive instruction signals are sent to the servodrivers $17a$–$17f$ (FIG. 3) for rotationally moving the respective joints $3a$–$3f$ of the robot 2, as previously planned.

In S63, the steps S57–S62 are repeated until the nth interpolation point (target teaching point) is reached.

In S64, if the target teaching point is reached, j is increased by one (1).

In S65, if the next teaching point corresponding to j+1 is available, the steps S52–S64 are repeated by using the next teaching point as a new target point.

In S66, if the next teaching point is no longer available, the playback procedure is terminated.

In this way, the robot 2 is so controlled that the tool $7a$ performs its treatment relative to the workpiece W along the planned trajectory formed by the series of teaching points.

According to the present invention, the task program prepared for the tool $7a$ can be conveniently utilized for making task programs for the other tools $7b$, $7c$ (FIG. 9) or for other workpieces because the task program for the tool $7a$ includes $Et_1$, $Ew_1$ as the setting data and $wXt_j$ as part of the teaching data. This point, which is one of the most important advantages of the present invention, is now described with reference to FIGS. 13–18.

Figure 13:
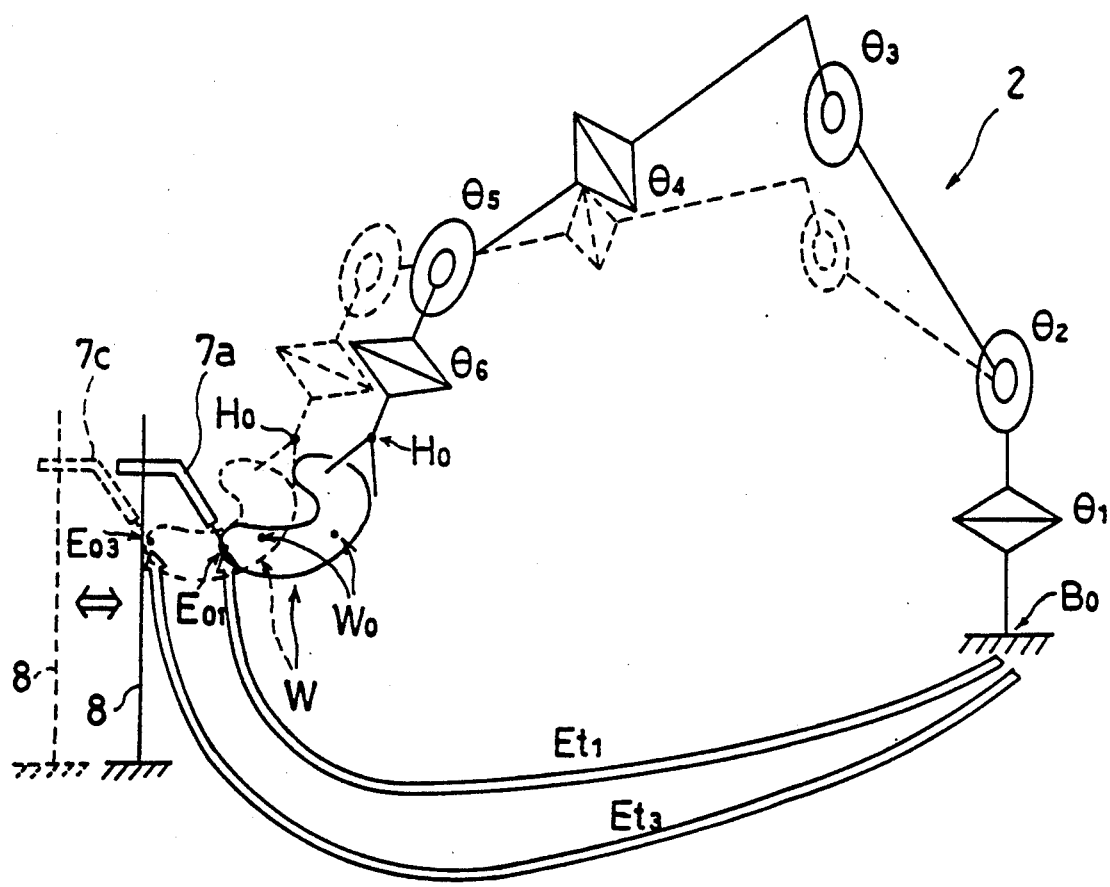
FIG. 13 is a schematic view illustrating a change of the tool position.

In FIG. 13 (and FIG. 9 as well), the tool $7a$ (hereafter referred to as "first tool") is shown with the tool $7c$ (hereafter referred to as "third tool") which performs the same kind of task (welding for example). The third tool $7c$ has a tip $Eo_3$ whose positional and attitudinal relation relative to the robot base reference point Bo is denoted by $Et_3$.

Since the third tool $7c$ performs the same task as the first tool $7c$ with respect to an identically configured workpiece W, the positional and attitudinal relation $Ew_1$ (see FIG. 9) of the workpiece reference point Wo relative to the mechanical interface point Ho is applicable with respect to both of the first and third tools $7a$, $7c$. Further, for the same reason, the positional and attitudinal relation wXt (see FIG. 9) of the third tool tip $Eo_3$ relative to the workpiece reference point Wo is also the same as that of the first tool tip $Eo_1$.

Figure 14:
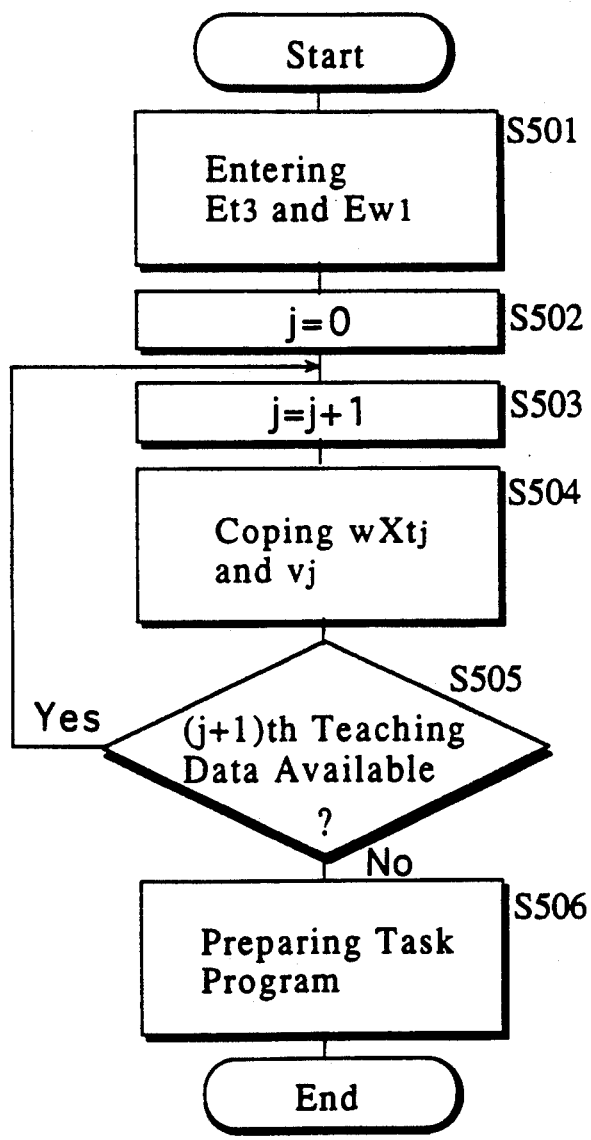
FIG. 14 is a flow chart illustrating how to use an existing task program for making a new task program adapted to the changed tool position.
Figure 15:
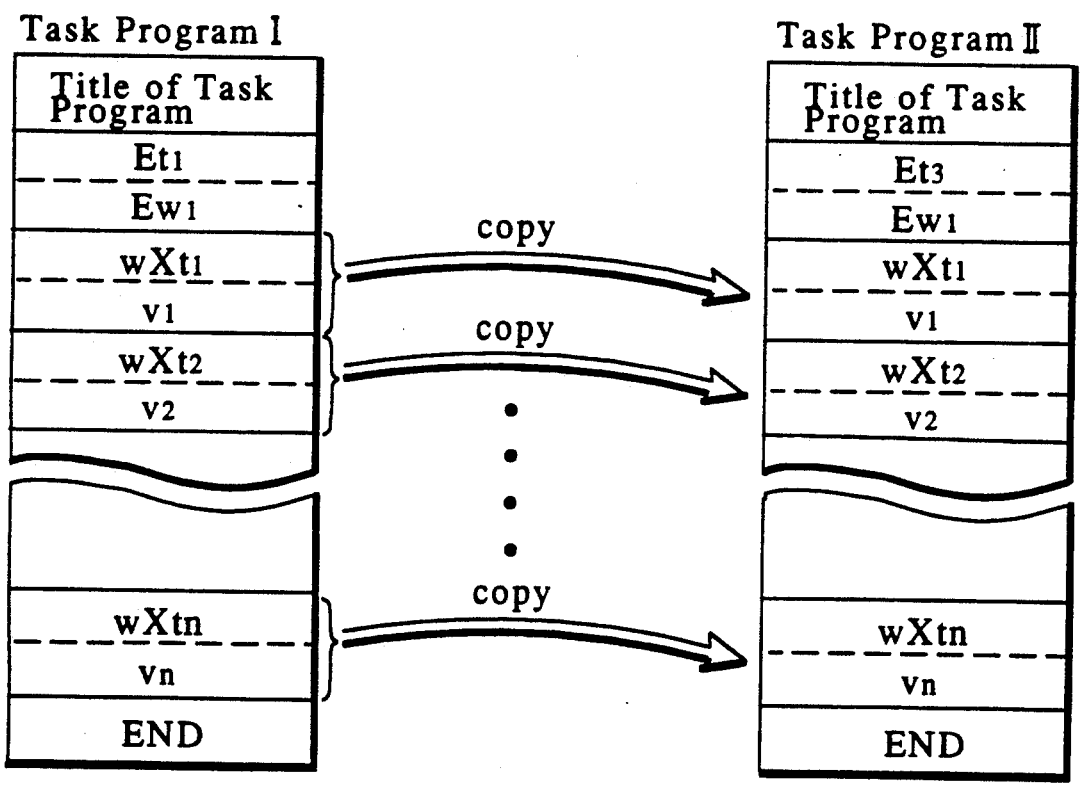
FIG. 15 is a view showing comparison between the existing task program and the new task program.

FIG. 14 shows a flow diagram for preparing a task program for the third tool $7c$ on the basis of the task program already prepared for the first tool $7a$. FIG. 15 shows a comparison between the task program I for the first tool $7a$ and the task program II for the third tool $7c$.

As shown in FIG. 14, entry of the setting data $Et_3$ and $Ew_1$ are performed in S501, and j is set at zero (0) in S502. Then, j is increased by one (1) in S503, whereas the $wXt_j$ data for the first tool $7a$ are simply copied for the third tool $7c$ in S504 (see also FIG. 15). After entirely copying the $wXt_j$ data (S505), the task program II for the third tool $7c$ is prepared in S506 by combining the copied $wXt_j$ data with the setting data $Et_3$, $Ew_1$. Thus, the task program II can be prepared very easily by copying most portion of the existing task program I.

Apparently, the playback procedure for the third tool $7c$ may be performed substantially in the same manner as that for the first tool $7a$ (see FIG. 12) once the task program II is made.

Returning to FIG. 9, the task program I (FIG. 15) for the first tool $7a$ may be also utilized to prepared a task program for the remaining tool $7b$ (hereafter referred to as "second tool") which performs a different kind of task (grinding for example). More specifically, when the second tool $7b$ is made to grind a weld bead of the workpiece W which has previously undergone the welding operation at the first tool $7a$, there is no need to make any adjustment with respect to $Ew_1$ and wXt even at the time of grinding by the second tool $7b$. Thus, the task program I for the first tool $7a$ may be conveniently used for preparing a task program for the second tool $7b$ substantially in the same manner as described with reference to FIGS. 13–15.

Figure 16:
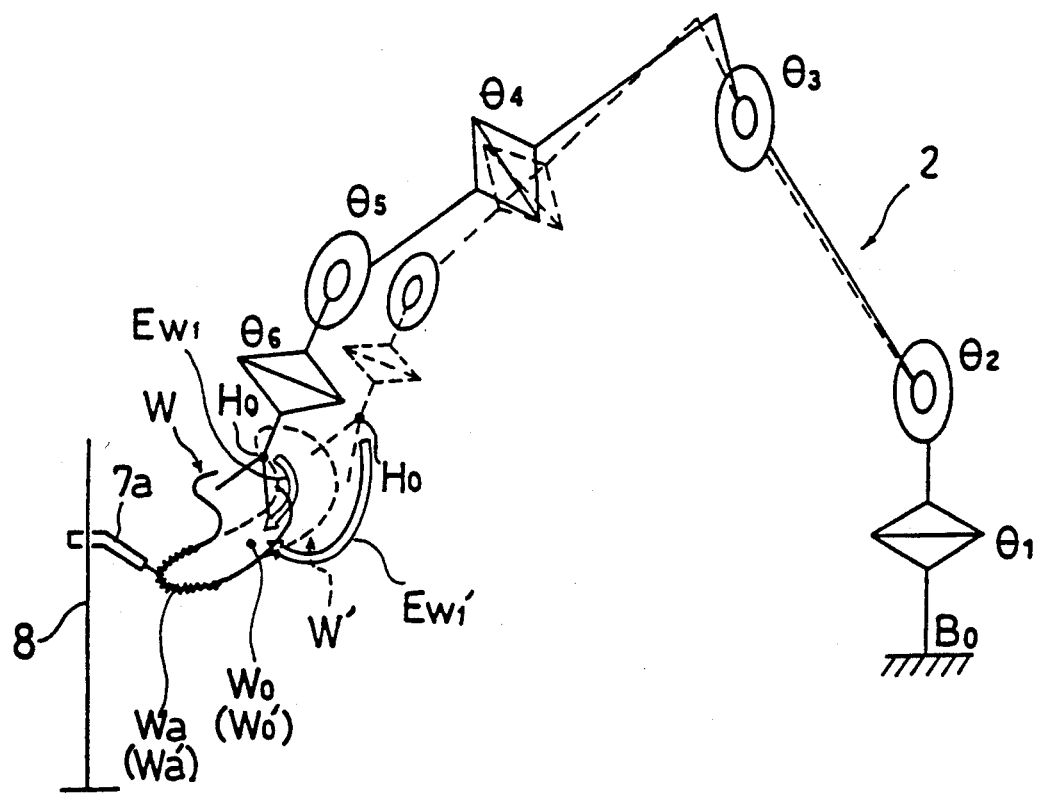
FIG. 16 is a schematic view illustrating a change of the workpiece holding position provided by the robot hand.

FIG. 16 illustrates how to make an adjustment when the present workpiece W (original) is replaced by a modified workpiece W' with respect to the first tool $7a$. For simplicity, it is assumed that the modified workpiece W' is longer than the original workpiece W but has a work target portion Wa' which is identical in shape to the work target portion Wa of the original workpiece W.

Under the above assumption, the positional and attitudinal relation $Ew_1'$ of the modified workpiece reference point Wo' relative to the mechanical interface point Ho differs from the $Ew_1$ of the original workpiece W. However, the positional and attitudinal relation wXt (see FIG. 9) of the first tool $7a$ relative to the original workpiece reference point Wo is also applicable with respect to the modified workpiece reference point Wo'.

Figure 17:
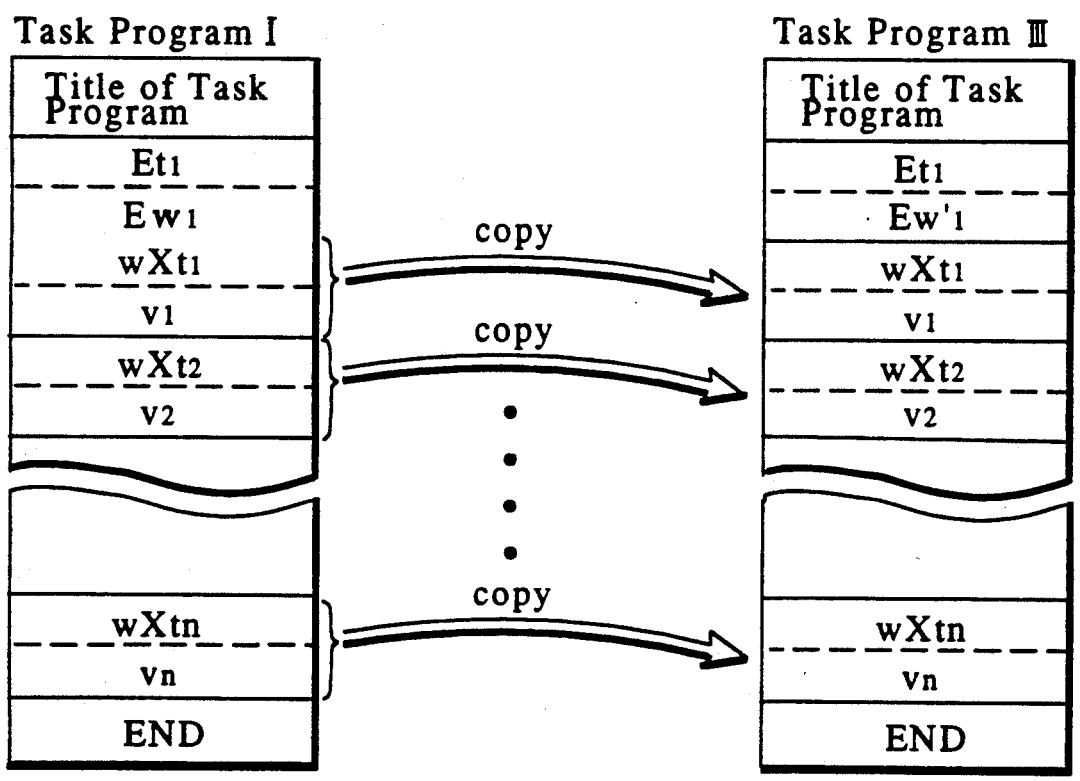
FIG. 17 is a view showing how to use an existing task program for making a new task program adapted to the changed workpiece holding position.

Therefore, as shown in FIG. 17, a task program III adapted to the modified workpiece W' can be easily prepared by copying the task program I for the original workpiece W except that $Ew_1$ is substituted by $Ew_1'$.

Figure 18:
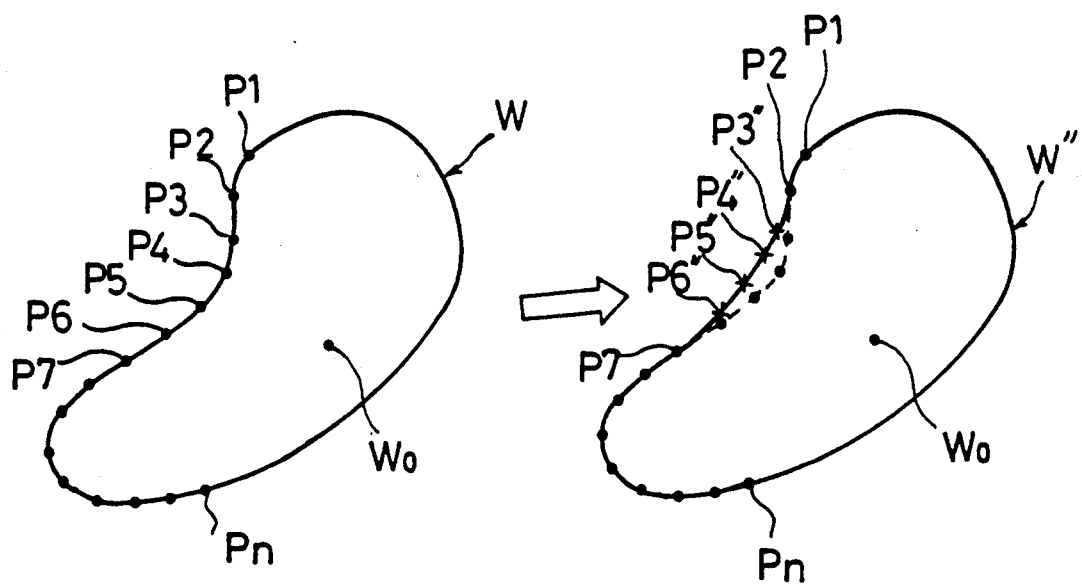
FIG. 18 is a view illustrating a change of the workpiece configuration.

FIG. 18 illustrates how to make an adjustment when the present workpiece W (original) is replaced by another modified workpiece W" which differs slightly only in the shape of work target portion from the original workpiece W. Specifically, the original workpiece has a work target portion formed by points P1, P2, P3, P4, P5, P6, P7, --- Pn, whereas the modified workpiece W" has a work target portion formed by points P1, P2, P3", P4", P5", P6", P7, --- Pn. The modified workpiece W" is otherwise the same as the original workpiece W.

Figure 19:
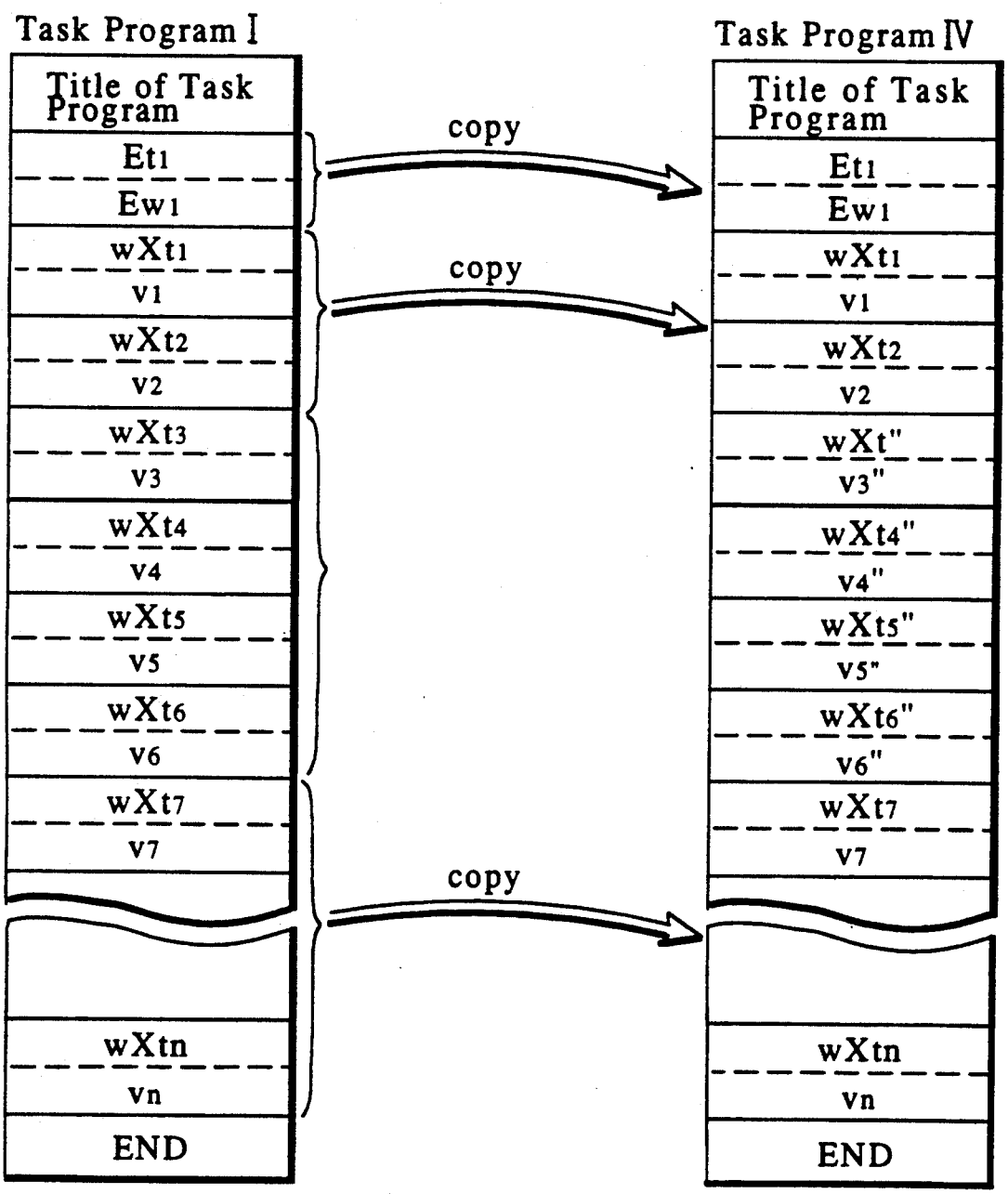
FIG. 19 is a view showing how to use an existing task program for making a new task program adapted to the changed workpiece configuration.

Therefore, as shown in FIG. 19, a task program IV adapted to the modified workpiece W" can be easily prepared by copying the task program I for the original workpiece W except that $wXt_3$–$wXt_4$ corresponding to the points P3–P6 (teaching points) of the original workpiece W are substituted by $wXt_3''$–$wXt_4''$ corresponding to the points P3"–P6".

8. Description of Second Embodiment:

Next, the second embodiment of the present invention is described with reference to FIGS. 20–24.

Figure 20:
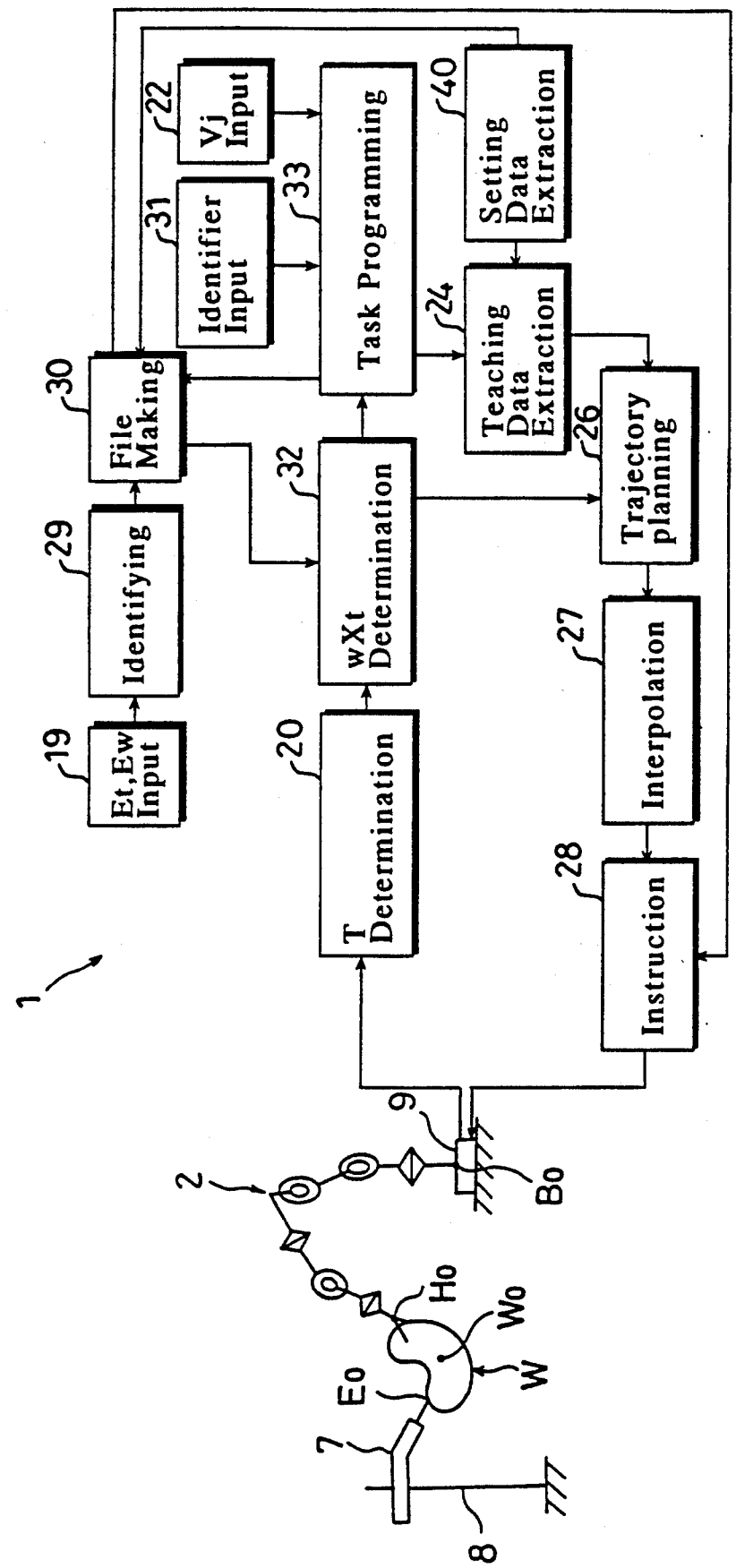
FIG. 20 is a control block diagram according to a second embodiment of the present invention.

Referring to FIG. 20, the control apparatus 1 of the second embodiment comprises a setting data input means 19, a T determination means 20, a speed input means 22, a teaching data extraction means 24, a trajectory planning means 26, an interpolation means 27 and an instruction means 28, similarly to the control apparatus of the first embodiment. Further, the control apparatus 1 of the second embodiment comprises the following elements.

An identifying means 29 gives identifiers to a plurality of setting data entered by the setting data input means 19.

A file making means 30 prepares and stores a file of thus identified setting data.

An identifier input means 31 selects desired ones from the plurality of setting data and supplies the corresponding identifiers for input to a task programming means 33.

A wXt determination means 32 calculates the positional and attitudinal relation $wXt_j$ of the tool tip Eo relative to the workpiece reference point Wo. Such calculation is performed on the basis of the setting data which are read out from the file making means 30 in response to the identifiers entered by the identifier input means 31, and on the basis of the positional and attitudinal relation T of the mechanical interface point Ho relative to the base reference point Bo as determined at the T determination means 20.

The task programming means 33 generates a plurality of teaching data which include the translational speed $V_j$ entered at the speed input means 22, the $wXt_j$ data calculated at the wXt determination means 32, and the identifers entered at the identifier input means 31. The task programming means 33 also prepares a task program on the basis of the teaching data, and stored the thus prepared task program.

A setting data extraction means 40 takes out the setting data from the file making means 30 according to the identifiers which are included in the teaching data taken out by the teaching data extraction means 24.

Next, the operation of the control apparatus 1 according to the second embodiment is described starting from the teaching procedure. It should be understood that the control apparatus 1 of the second embodiment is used to control the robot 2 successively with respect to a plurality of tools although only one tool 7 is illustrated in FIG. 20.

Figure 21:
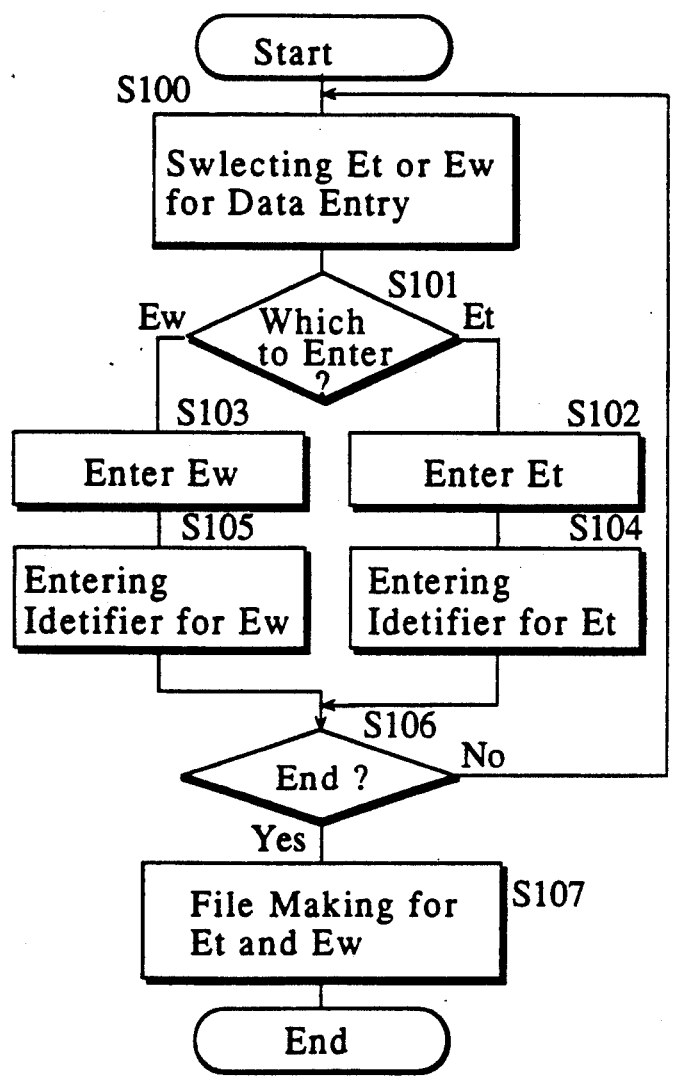
FIG. 21 is a flow chart showing the steps of making a file of identified setting data as a preliminary part of the teaching procedure performed according to the second embodiment.

FIG. 21 is a flow diagram showing the steps for making a file of identified setting data. In S100 and S101, the changeover switch 46 of the teach pendant 11 (see FIG. 2) is operated to select the setting-data input mode, and selection is made whether to enter the positional and attitudinal relation Et of the tool tip Eo relative to the base reference point Bo or the positional and attitudinal relation Ew of the workpiece reference point Wo (see also FIG. 4) relative to the mechanical interface point Ho.

If data entry of Et is selected, the teach pendant 11 is operated to enter Et data in S102. This step is followed by S104 wherein a corresponding identifier is entered for the Et data again by using the teach pendant 11.

Similarly, if data entry of Ew is selected, the teach pendant 11 is operated to enter Ew data in S103. This step is followed by S105 wherein a corresponding identifier is entered for the Ew data again by using the teach pendant 11.

The steps S100–S105 are repeated until all different Et and Ew data corresponding to different tools (and-/or different workpieces if applicable) are entered and identified.

If a terminating instruction is given by the teach pendant (FIG. 2) in S106, the filing making means 30 (FIG. 20) is caused to make and store a file of different setting data (Et and Ew) respectively having different identifiers.

Figure 22:
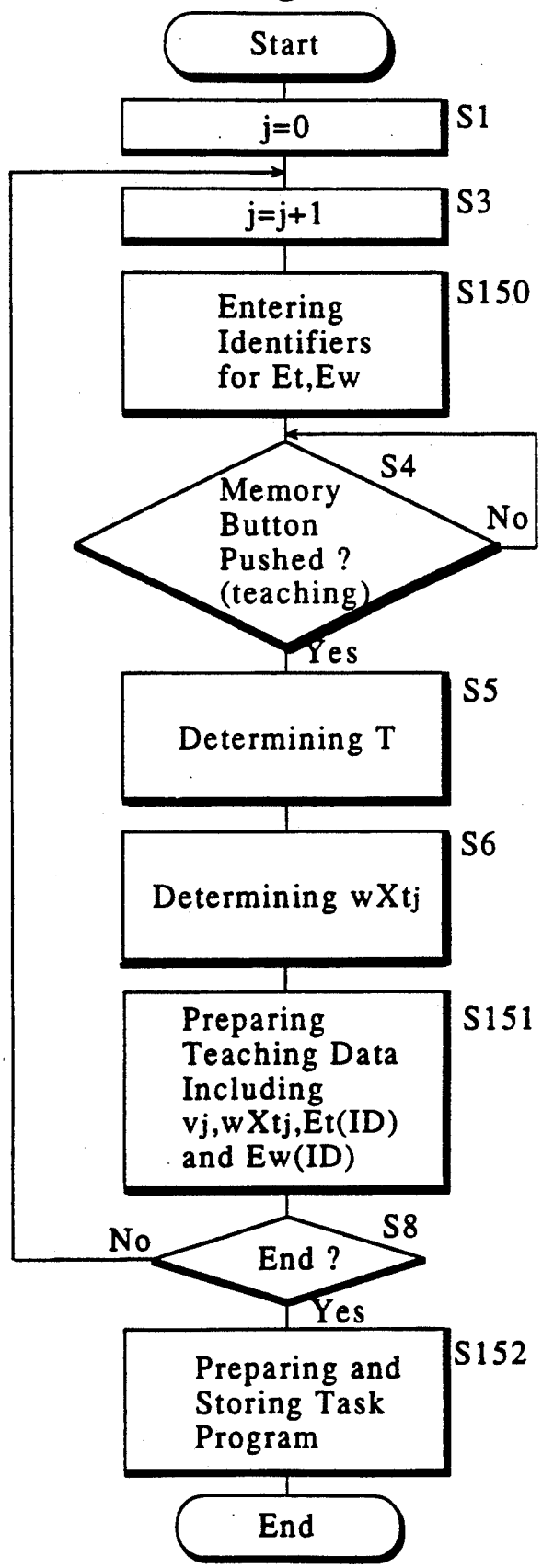
FIG. 22 is a flow chart showing a main part of the teaching procedure performed according to the second embodiment.

FIG. 22 is a flow diagram showing the steps up to making a task program.

First, the numeral zero (0) is entered as the serial number j of the teaching data in S1, which is followed by S3 wherein j is increased by one (1) to be ready for making the teaching data.

In S150, the teach pendant 11 (FIG. 2) is operated to enter the identifiers corresponding to the tool 7 and workpiece W (FIG. 20) which are undergoing teaching at the jth teaching point.

In S4, the robot 2 holding the workpiece W is manually manipulated, by using the robot operation buttons 42 (see FIG. 2) of the teach pendant 11, to assume a desired position for teaching. Then, the teaching point memory button 43 (FIG. 2) is pushed to store the present position (jth teaching point).

In S5, the joint variables ($\theta_1$–$\theta_6$) of the robot 2 are detected for determining the positional and attitudinal relation T of the mechanical interface point Ho relative to the base reference point Bo. Such determination can be done at the T determination means 20 (see FIG. 20) by performing calculation in accordance with the formulas (18)–(20).

In S6, the wXt determination means 32 (see FIG. 20) is caused to calculate the positional and attitudinal relation $wXt_j$, of the tool tip $Eo_j$ relative to the workpiece reference point Wo by using the equation (28).

In S151, the translational speed $v_j$ of the workpiece W relative to the tool is numerically entered from the speed input means 22 (see FIG. 20) by using the teach pendant 11 (see FIG. 2).

Further, the task programming means 33 (FIG. 20) is caused to prepare and store a teaching data including $v_j$. $wXt_j$ and the identifiers of Et, Ew.

The steps S3–S151 are repeated with respect to a required number of teaching points (covering the plurality of tools 7). Thereafter, in S8, the END button 44 (see FIG. 2) of the teach pendant 11 is pressed to terminate the teaching procedure.

In S152, the task programming means 33 (FIG. 20) is caused to prepare and store a task program which includes a series of teaching data which are required for operating the robot 2 successively with respect to the series of tools 7.

Figure 23:
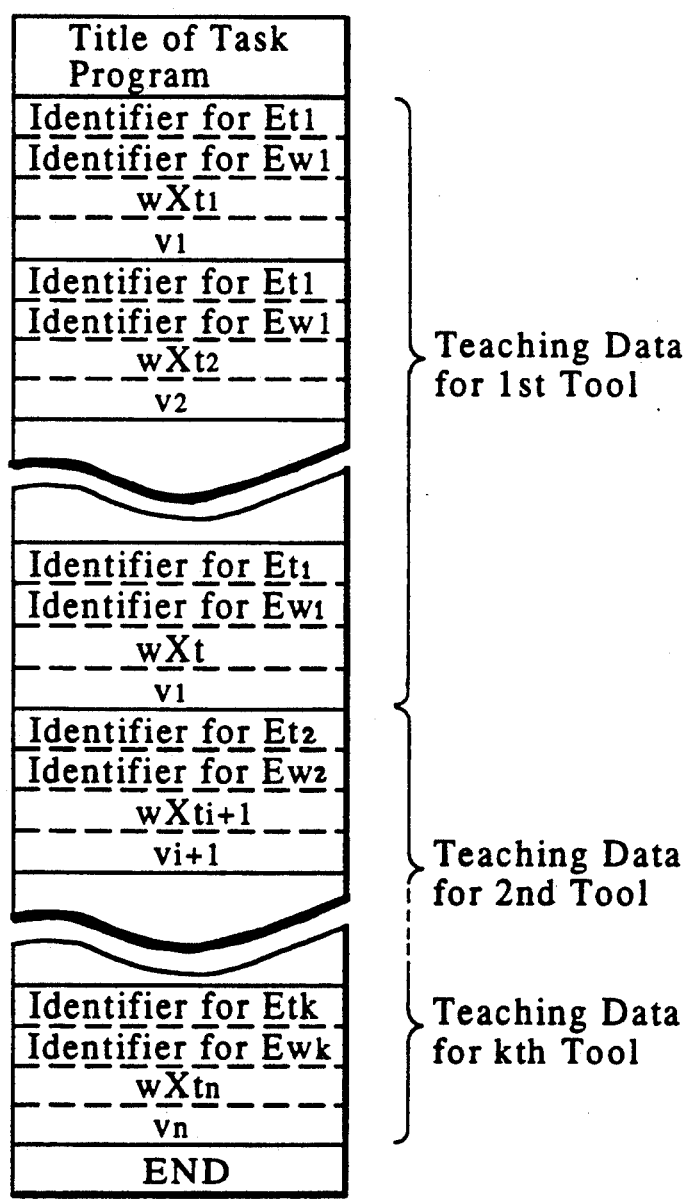
FIG. 23 is a view showing the content of the task program prepared according to the second embodiment.

FIG. 23 shows the content of the task program thus prepared. It is important to note that the single task program includes the teaching data for the plurality of tools 7, and that each teaching data includes the identifiers for the setting data ($Et_1$ and $Ew_1$) in addition to the information about $wXt_j$ and $v_j$.

Figure 24:
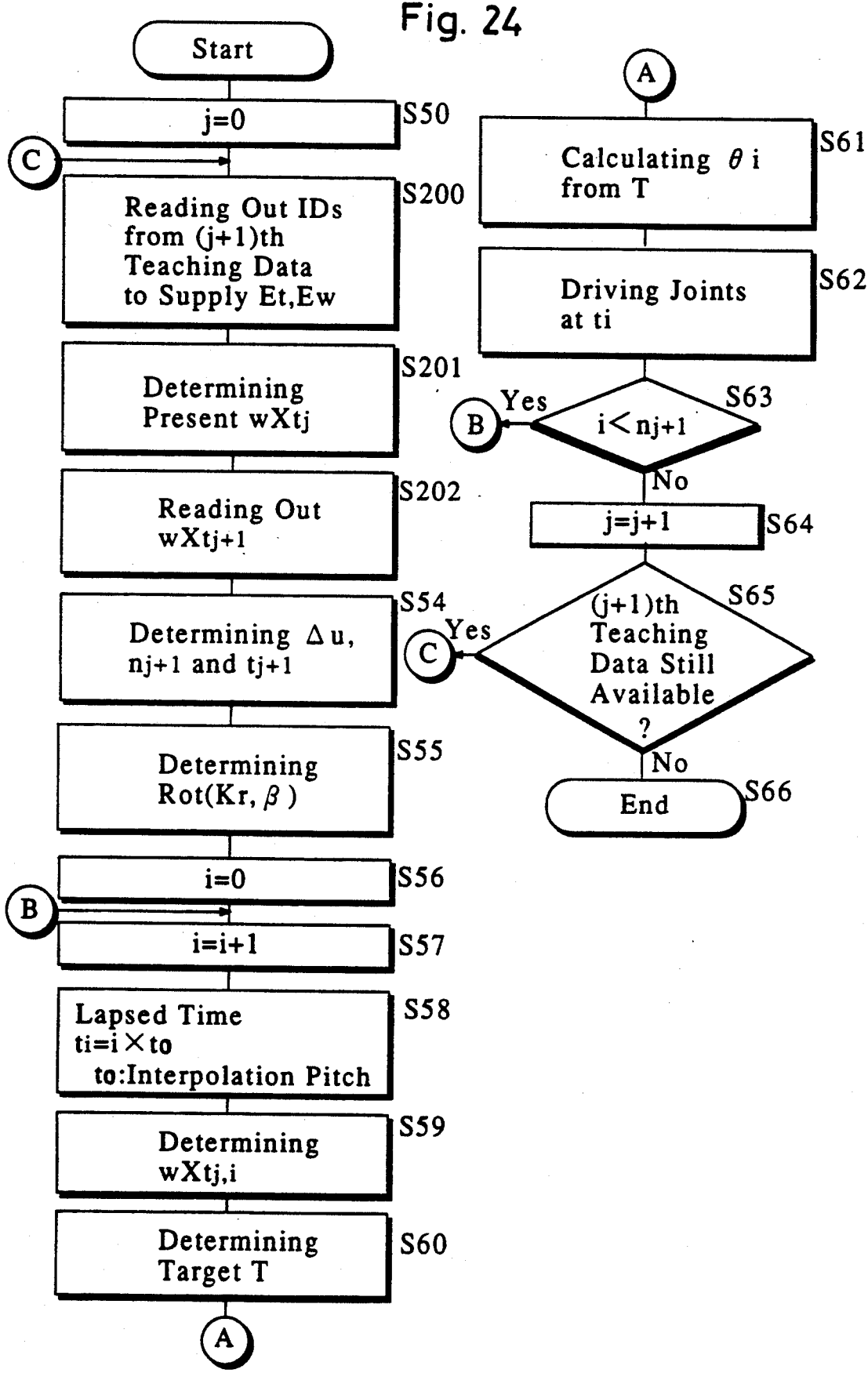
FIG. 24 is a flow chart showing the playback procedure according to the second embodiment.

Next, the playback procedure for the second embodiment is described with reference to the flow diagram of FIG. 24.

In S50, the numeral zero (0) is entered as the serial number j of the teaching data.

In S200, the setting data extraction means 40 (FIG. 20) reads out the identifiers from the (j+1)th teaching data, causing the file making means to supply the corresponding Et and Ew.

In S201, the present joint variables ($\theta_1$–$\theta_6$) of the robot 2 are detected for determining the positional and attitudinal relation T of the mechanical interface point Ho relative to the base reference point Bo according to the formulas (18)–(20). Further, the wXt determination means 32 (see FIG. 20) is caused to calculate the positional and attitudinal relation $wXt_j$, at the present instance, of the tool tip $Eo_1$ relative to the workpiece reference point Wo according to the equation (28). The $wXt_j$ thus obtained is used as a starting point for subsequent interpolation.

In S202, the $wXt_{j+1}$ at the (j+1)th teaching point is taken out from the task program as a target point for subsequent interpolation.

Figure 12:
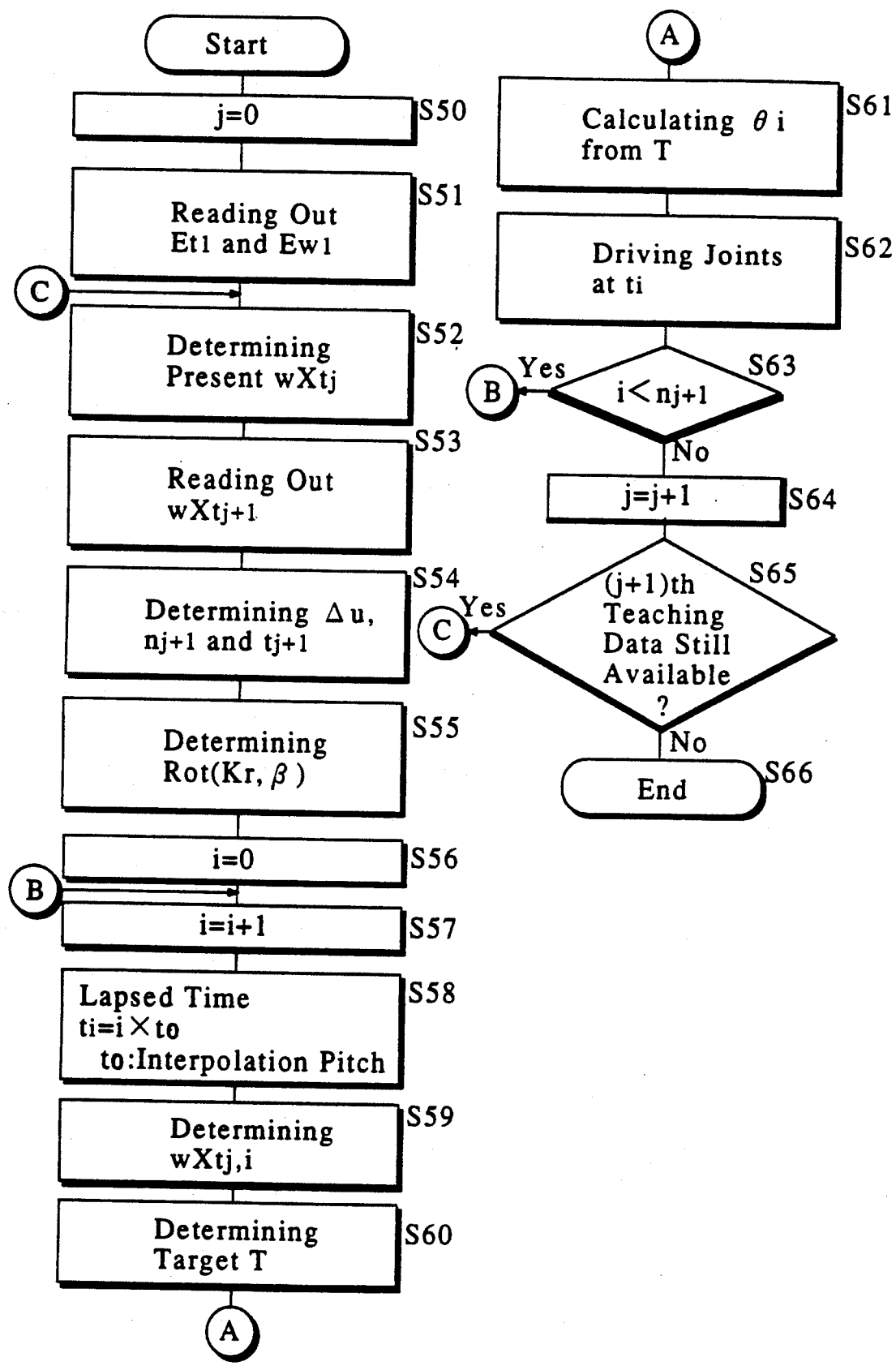
FIG. 12 is a flow chart showing the playback procedure according to the first embodiment.

The steps S54–S64 are substantially the same as those of the playback procedure for the first embodiment (see FIG. 12).

In S65, if the next teaching point corresponding to j+1 is available, the steps S200–S64 are repeated by using the next teaching point as a new target point.

In S66, if the next teaching point is no longer available, the playback procedure is terminated.

9. Description of Third Embodiment

Next, the third embodiment of the present invention is described with reference to FIGS. 25 and 26.

Figure 25:
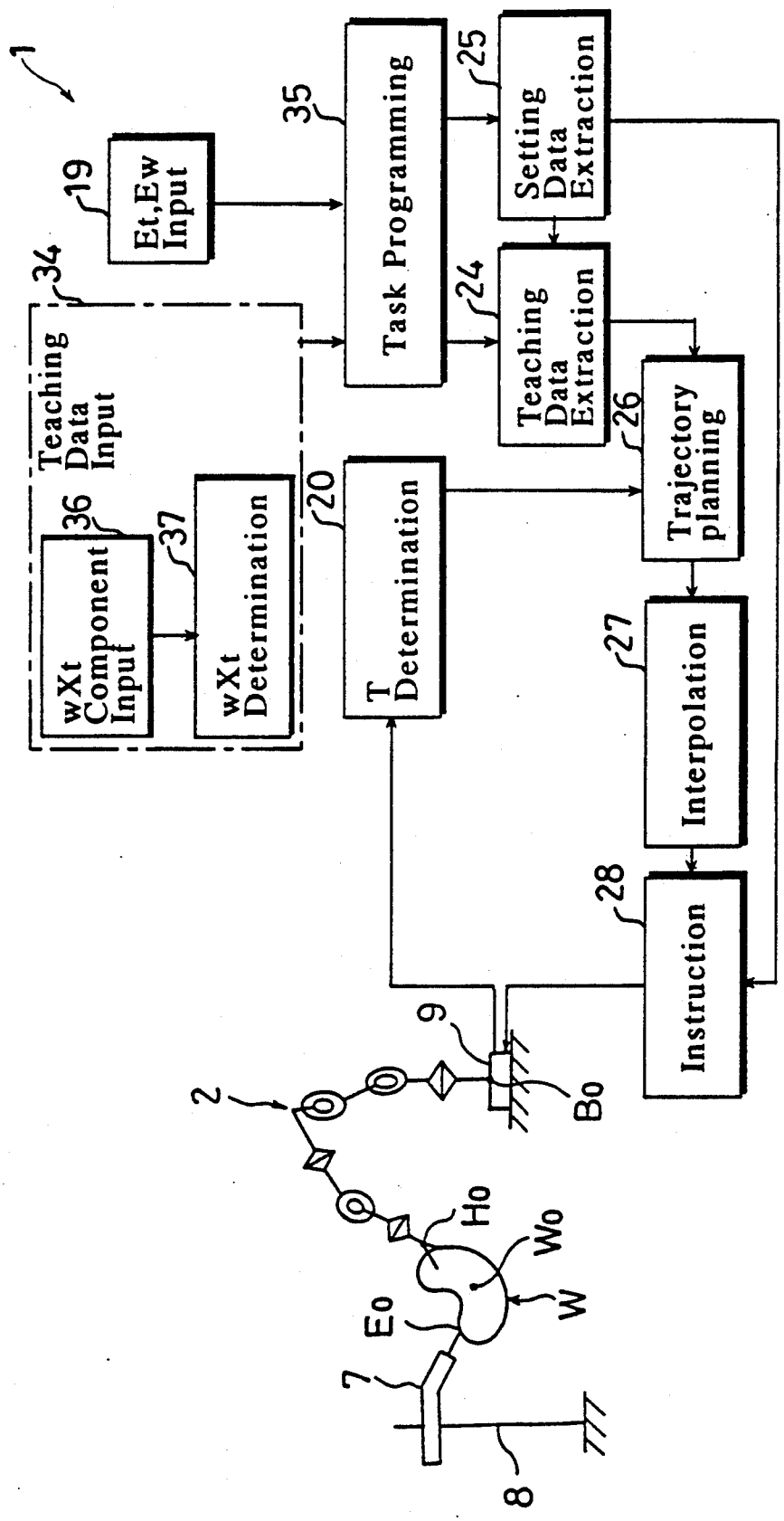
FIG. 25 is a control block diagram according to a third embodiment of the present invention.

Referring to FIG. 25, the control apparatus 1 of the third embodiment comprises a setting data input means 19, a T determination means 20, a teaching data extraction means 24, a setting data extraction means 25, a trajectory planning means 26, an interpolation means 27 and an instruction means 28, similarly to the control apparatus of the first embodiment. Further, the control apparatus 1 of the third embodiment comprises the following elements.

A teaching data input means 34 is used to enter the positional and attitudinal relation $wXt_j$ of the tool tip Eo relative to the workpiece reference point Wo, and the translational speed $v_j$ of the workpiece W relative to the tool 7.

Specifically, the teaching data input means 34 includes a wXt component input means 36 which are used for entering the positional components Sx, Sy, Sz and attitudinal components $\theta x$, $\theta y$, $\theta z$ of the tool tip Eo relative to the workpiece reference point Wo, and a wXt determination means 37 for calculating $wXt_j$ on the basis of the information obtained from the wXt component input means 36.

A task programming means 35 generates a plurality of teaching data which include $v_j$ and $wXt_j$ entered at the teaching data input means 34. The task programming means 35 also prepares a task program on the basis of the teaching data and the setting data (Et and Ew) entered at the setting data input means 19, and stores the thus prepared task program.

Next, the operation of the control apparatus 1 according to the third embodiment is described. The control apparatus 1 of the third embodiment can be used to control the robot 2 with respect to a plurality of tools although only one tool 7 is illustrated in FIG. 25.

Figure 26:
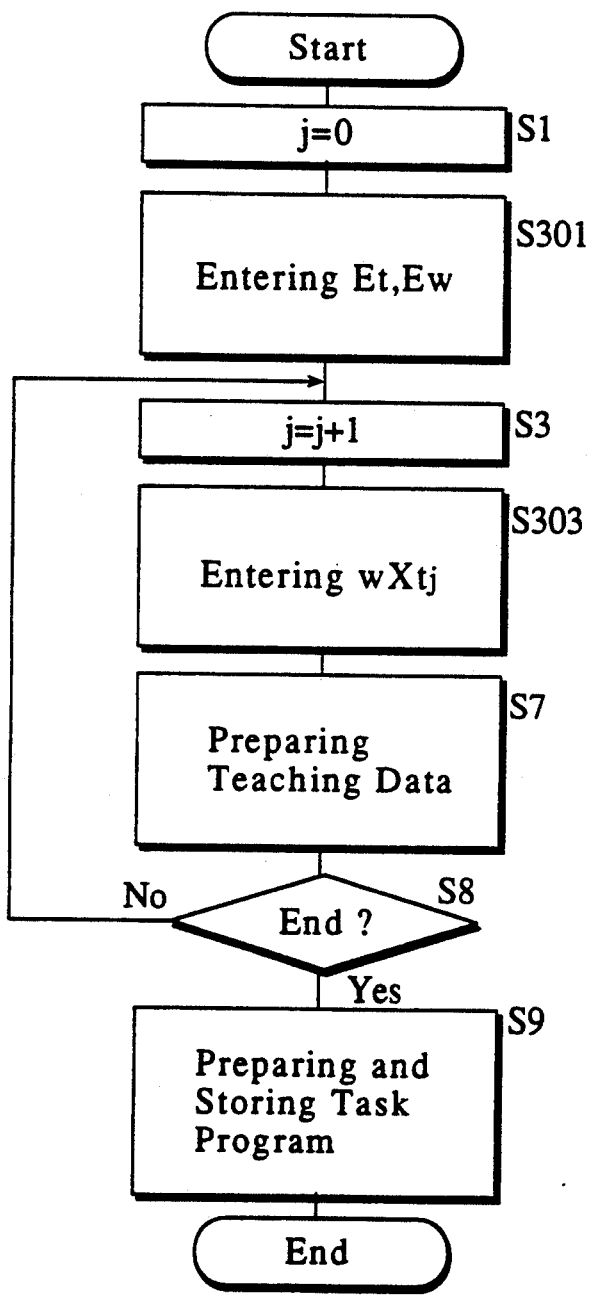
FIG. 26 is a flow chart showing the teaching procedure according to the third embodiment.

FIG. 26 is a flow diagram showing the steps up to making a task program.

First, the numeral zero (0) is entered as the serial number j of the teaching data in S1.

In S301, the positional and attitudinal relation Et of the tool tip Eo relative to the base reference point Bo as well as the positional and attitudinal relation Ew of the workpiece reference point Wo relative to the mechanical interface point Ho is supplied from the setting data input means 19 (see FIG. 25).

In S3, j is increased by one (1) to be ready for making the teaching data.

In S303, the teach pendant 11 (FIG. 2) is operated to enter the positional components Sx, Sy, Sz and attitudinal components $\theta x$, $\theta y$, $\theta z$ of the tool tip Eo relative to the workpiece reference point Wo, whereby the positional and attitudinal relation $wXt_j$ of the tool tip Eo relative to the workpiece reference point W is calculated according to the formula (21).

In S7, the translational speed $v_j$ of the workpiece W relative to the tool is numerically entered by the teaching data input means 34 (see FIG. 25). Further, the task programming means 35 (FIG. 20) is caused to prepare and store a teaching data including $v_j$ and $wXt_j$.

The steps S3–S7 are repeated with respect to a required number of teaching points. Thereafter, in S8, the END button 44 (see FIG. 2) of the teach pendant 11 is pressed to terminate the teaching procedure.

In S9, the task programming means 35 (FIG. 25) is caused to prepare and store a task program which includes a series of teaching data together with the setting data (Et and Ew).

The playback procedure for the third embodiment can be carried out substantially in the same manner as that for the first embodiment, so that it is not described here to avoid duplicated explanation.

As can be clearly understood, the third embodiment is very similar to the first embodiment but differs therefrom only in that the $wXt_j$ teaching data are prepared without actually moving the robot 2 according to the third embodiment. More specifically, the positional and attitudinal relation T of the robot mechanical interface point Ho relative to the base reference point Bo is necessary for determining $wXt_j$ according to the first embodiment (see the T determination means 20 connected to the wXt determination means 21 in FIG. 8), whereas the relation T is not necessary for determining $wXt_j$ according to the third embodiment (see the T determination means 20 connected only to the trajectory planning means 26 in FIG. 25). Thus, the third embodiment is particularly significant for example when the CAD (computer aided design) data of the workpiece W are directly usable for calculation of $wXt_j$.

10. Description of fourth Embodiment:

Next, the fourth embodiment of the present invention is described with reference to FIGS. 27 and 28.

Figure 27:
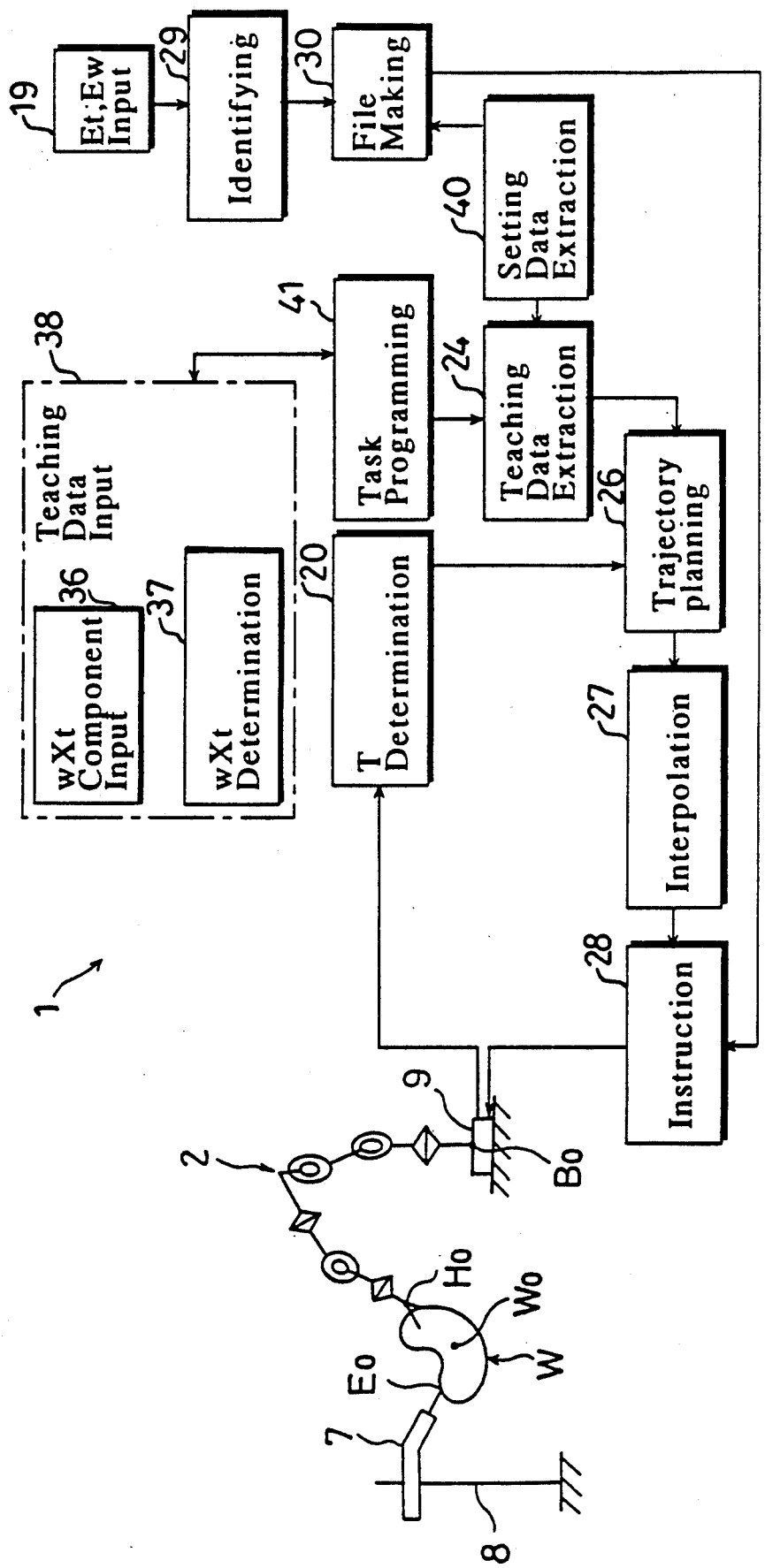
FIG. 27 is a control block diagram according to a fourth embodiment of the present invention.

Referring to FIG. 27, the control apparatus 1 of the fourth embodiment comprises a setting data input means 19, a T determination means 20, a teaching data extraction means 24, a trajectory planning means 26, an interpolation means 27 and an instruction means 28, similarly to the control apparatus of the first embodiment. Further, the control apparatus 1 also comprises an identifying means 29, a file making means 30, a setting data extraction means 40, similarly to the control apparatus of the second embodiment.

Like the third embodiment, the control apparatus 1 of the fourth embodiment also comprises a teaching data input means 38 which is used for entering the positional and attitudinal relation $wXt_j$ of the tool tip Eo relative to the workpiece reference point Wo, and the translational speed $v_j$ of the workpiece W relative to the tool 7. However, the teaching data input means 38 of the fourth embodiment has an additional function of numerically entering the identifiers for the corresponding setting data (Et and Ew).

A task programming means 41 generates a plurality of teaching data which include the translational speed $v_j$, the $wXt_j$ data and the setting data identifiers all entered at the teaching data input means 38. The task programming means 41 also prepares a task program on the basis of the teaching data, and stores the thus prepared task program.

Next, the operation of the control apparatus 1 according to the fourth embodiment is described. Again, the control apparatus 1 of this embodiment is used to control the robot 2 successively with respect to a series of tools although only one tool 7 is illustrated in FIG. 27.

First, the steps corresponding to S100-S107 shown in FIG. 21 for the second embodiment are performed for making a file of different setting data (Et and Ew). These setting data respectively have different identifiers and correspond to different tools 7.

Figure 28:
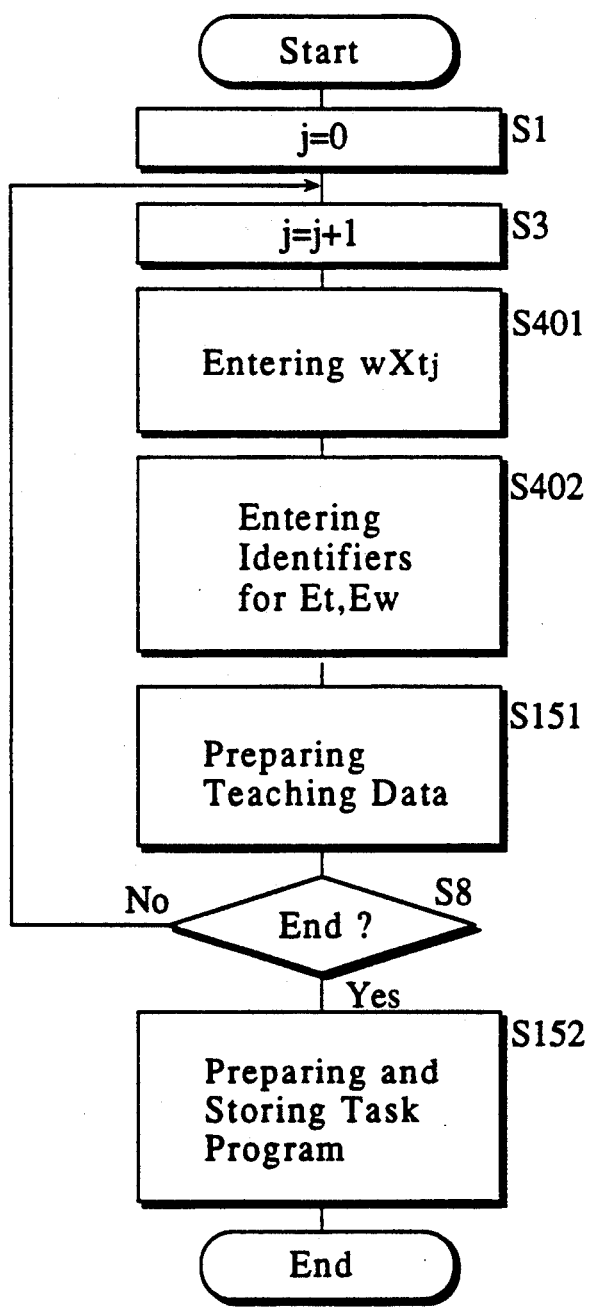
FIG. 28 is a flow chart showing the teaching procedure according to the fourth embodiment.

FIG. 28 is a flow diagram showing the steps up to making a task program.

First, the numeral zero (0) is entered as the serial number j of the teaching data in S1, which is followed by S3 wherein j is increased by one (1) to be ready for making the teaching data.

In S401, the teach pendant 11 (FIG. 2) is operated to enter the positional components Sx, Sy, Sz and attitudinal components $\theta x$, $\theta y$, $\theta z$ of the tool tip Eo relative to the workpiece reference point Wo, whereby the positional and attitudinal relation $wXt_j$ of the tool tip Eo relative to the workpiece reference point W is calculated according to the formula (21).

In S402, the teach pendant 11 (FIG. 2) is operated to enter the identifiers corresponding to the tool 7 and workpiece W (FIG. 20) which are undergoing teaching at the jth teaching point.

In S151, the translational speed $v_j$ of the workpiece W relative to the tool is numerically entered by the teach pendant 11 (see FIG. 2). Further, the task programming means 41 (FIG. 27) is caused to prepare and store a teaching data including $v_j$, $wXt_j$ and the identifiers of Et, Ew.

The steps S3-S151 are repeated with respect to a required number of teaching points (covering the series of tools 7). Thereafter, in S8, the END button 44 (see FIG. 2) of the teach pendant 11 is pressed to terminate the teaching procedure.

In S152, the task programming means 41 (FIG. 27) is caused to prepare and store a task program which includes a series of teaching data which are required for operating the robot 2 successively with respect to the series of tools 7.

The playback procedure for the fourth embodiment can be carried out substantially in the same manner as that for the second embodiment, so that it is not described here to avoid duplicated explanation.

11. Description of Alternative Robbot Arrangement:

All of the joints 3a-3f of the robot 2 shown in FIGS. 1 and 5 make only rotational movement. However, the present invention may be also used for controlling a robot which has one or more linearly movable joints (translational joints). An example of such a robot is shown in FIGS. 29 and 30.

Figure 29:
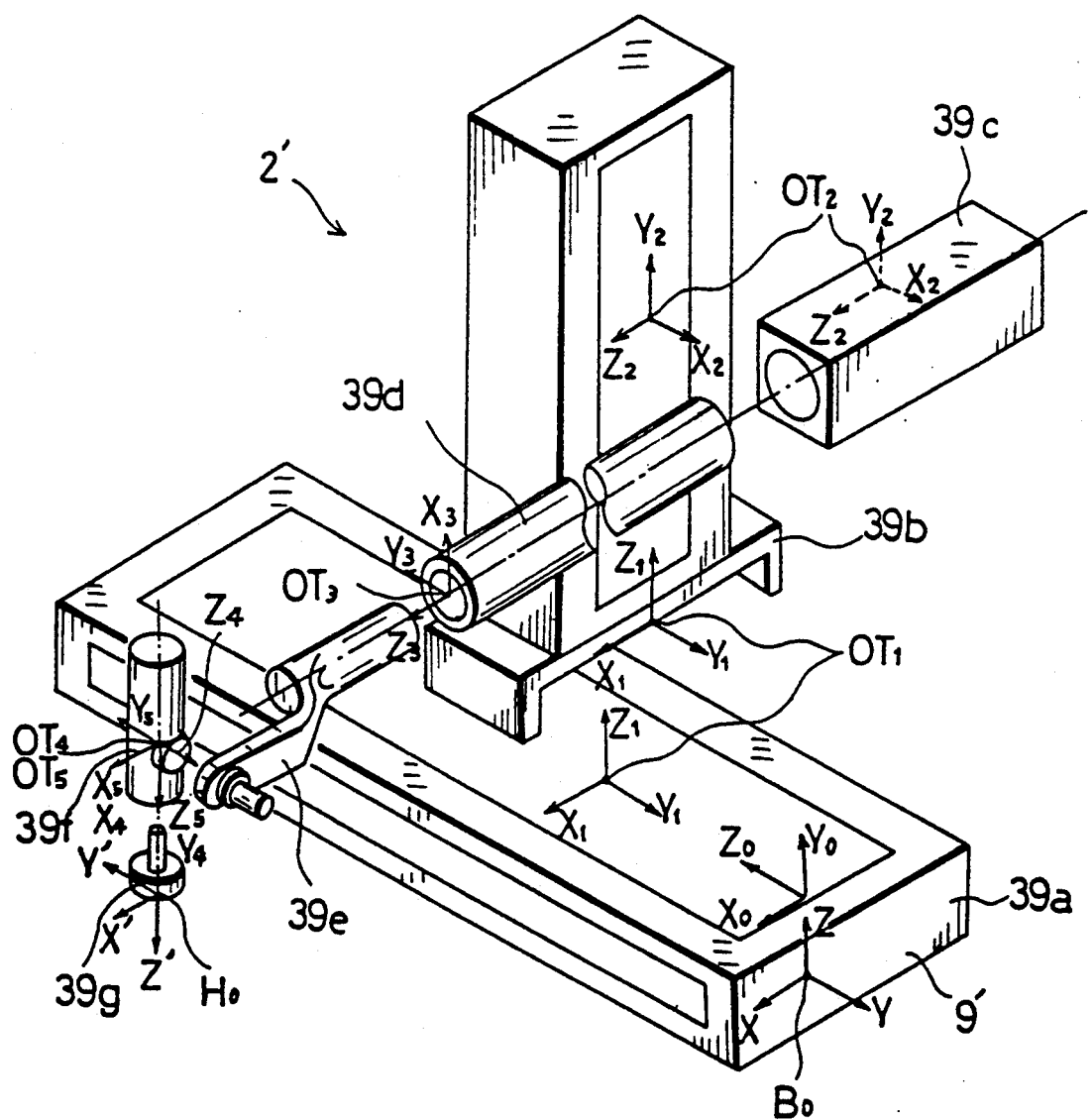
FIG. 29 is a perspective view showing an alternative robot which may be controlled by the control apparatus according to the present invention.
Figure 30:
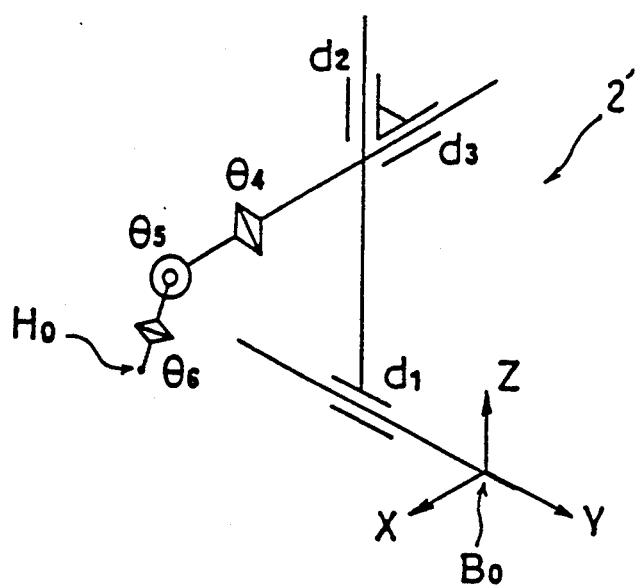
FIG. 30 is a schematic view showing the same robot.

The alternative robot 2' shown in FIGS. 29 and 30 includes a a base link 39a serving as a base 9', a first link 39b serving as a first linearly movable joint, a second link 39c serving as a second linearly movable joint, a third link 39d serving as a third linearly movable joint, a fourth link 39e serving as a fourth rotary joint, a fifth link 39f serving as a fifth rotary joint, and a sixth link 39g serving as a sixth rotary joint. Different coordinate systems Bo-XYZ, $OT_0$-$X_0Y_0Z_0$ to $OT_5$-$X_5Y_5Z_5$ and Ho-X'Y'Z' are related to the respective links 39a-39g.

According to the DH notation already described above, the relation An between each two successive coordinate systems is expressed by the formula (17) which is given hereinbefore.

$$An = Rot(Z, \theta n) \cdot Trans(0, 0, dn) \cdot Trans(an, 0, 0) \cdot Rot(X, an) \quad (17)$$

The parameters $\theta n$, dn, an and $\alpha n$ for the respective links 39a-39g are given in the following Table 2.

TABLE 2

| No. | Likn | $\theta n$ | an | dn | $\alpha n$ |
|---|---|---|---|---|---|
| 0 | Base Link | 0.0 | 0.0 | $d_0$ | $+\pi/2$ |
| 1 | 1st Link | 0.0 | 0.0 | $d_1$ | $-\pi/2$ |
| 2 | 2nd Link | $+\pi/2$ | 0.0 | $d_2$ | $+\pi/2$ |
| 3 | 3rd Link | $+\pi/2$ | 0.0 | $d_3$ | 0.0 |
| 4 | 4th Link | $\theta_4$ | 0.0 | $d_4$ | $-\pi/2$ |
| 5 | 5th Link | $\theta_5$ | 0.0 | 0.0 | $+\pi/2$ |
| 6 | 6th Link | $\theta_6$ | 0.0 | $d_6$ | 0.0 |

As appreciated by comparing Tables 1 and 2, the joint variables $\theta_1$-$\theta_3$ for the robot 2 of FIGS. 1 and 5 need be replaced by the joint varibales $d_1$-$d_3$ for the robot 2' of FIGS. 29 and 30. By doing so, the control apparatus 1 according to the present invention may be used for controlling the alternative robot 2'.

12. Advantages of the present invention:

The present invention described above on the basis of the four different embodiments is featured by the fact that the task program prepared and stored in the task programming means 23, 33, 35, 41 includes the setting data (Et and Ew) as well as the positional and attitudinal relation wXt of the tool tip Eo relative to the workpiece reference point Wo (see FIGS. 11 and 23). Thanks to this feature, the present invention has the following advantages.

(1) Since the task program (teaching data) itself includes the wXt data which is directly indicative of the relation between the tool and the workpiece, the state of the treatment (work) performed by the tool can be easily recognized. Indeed, the most important parameter for controlling the robot is the relation between the tool and the workpiece because the robot movement is a factor which should be controlled to realize the required positional and attitudinal relation between the tool and the workpiece. Thus, it is better that the task program includes the wXt data than the data directly indicative of the robot movement.

(2) Since the wXt data is directly related to the configuration and dimension of the workpiece, the CAD data relating to the workpiece, if available, can be immediately utilized for making the teaching data (including the wXt data) even without actually moving the robot itself, as already described in connection with the third and fourth embodiments (see FIGS. 25-28).

(3) If the task program prepared for a particular combination of a tool and a workpiece is later found to require a correction as to the relation between the tool and the workpiece, such a correction can be easily performed because the task program itself includes the wXt data which need be corrected.

(4) When the position and attitude of the tool are changed, it is only necessary to modify the existing task program with respect to the positional and attitudinal relation Et relative to the base reference point Bo of the robot 2. In other words, the teaching data of the existing task program can be simply copied to make a new task program which is perfectly applicable to the new position and attitude of the tool, as already described with reference to FIGS. 13-15.

(5) Similarly, when there is a change of the workpiece holding position (and/or attitude) provided by the robot 2, it is only necessary to modify the existing task program with respect to the positional and attitudinal relation Ew of the workpiece reference point Wo relative to the mechanical interface point Ho of the robot 2. In other words, the teaching data of the existing task program can be simply copied to make a new task program which is perfectly applicable to the new workpiece holding position, as already described with reference to FIGS. 16 and 17.

(6) When the configuration of the workpiece is slightly changed, it is usually sufficient to modify only a part of the existing teaching data (wXt), as already described with reference to FIGS. 18 and 19.

(7) In case the task program includes respective wXt data (corresponding to all of the teaching points) together with respective identifiers for a series of tools, it is possible to operate the robot successively with respect to the series of tools, as described in connection with the second embodiment of FIGS. 20-24 and the fourth embodiment of FIGS. 27 and 28.

13. Possibility for Modifications:

The present invention is not limited to the specific embodiments described above but may be modified in various ways. Such modifications are not to be regarded as a departure from the spirit and scope of the present invention, and all such modifications as would be obvious to those skilled in the art are intended to be included within the scope of the appended claims.

We claim:

1. A control apparatus for an articulated industrial robot which holds a workpiece for movement relative to at least one fixed tool, the robot having a base reference point and a mechanical interface point, the tool having a tool tip, the workpiece having a workpiece reference point, the control apparatus comprising:

setting data input means for entering setting data which include a positional and attitudinal relation Et of the tool tip relative to the robot base reference point as well as a positional and attitudinal relation Ew of the workpiece reference point relative to the robot mechanical reference point;

means for determining a positional and attitudinal relation T of the robot mechanical interface point relative to the robot base reference point;

means for supplying a positional and attitudinal relation $wXt_j$ of the tool tip relative to the workpiece reference point and for supplying a translation speed $v_j$ of the workpiece relative to the tool;

task programming means for preparing and storing a task program which includes a plurality of teaching data corresponding to teaching points, each of the teaching data containing at least the relation $wXt_j$ and the translational speed $v_j$;

teaching data extraction means for successively taking out the teaching data from the task program;

trajectory planning means for planning a trajectory of the workpiece relative to the tool in accordance with the teaching data taken out by the teaching data extraction means;

interpolation means for interpolating the trajectory between each two successive teaching points; and instruction means for causing the robot to move the workpiece along the interpolated trajectory.

2. The control apparatus according to claim 1, wherein the means for supplying the relation $wXt_j$ and the translational speed $v_j$ comprises wXt determination means, and speed input means separate from the wXt determination means; the wXt determination means calculating the relation $wXt_j$ on the basis of the setting data and the relation T for supplying the calculated relation $wXt_j$ to the task programming means; the speed input means supplying the translation speed $v_j$ to the task programming means.

3. The control apparatus according to claim 1, wherein the task program prepared and stored by the task programming means further includes the setting data together with the plurality of teaching data; the control apparatus further comprising setting data extraction means for taking out the setting data relations Et and Ew from the task program.

4. The control apparatus according to claim 1, wherein the setting data input means enters a plurality of setting data; the control apparatus further comprising identifying means, file making means, identifier input means, and setting data extraction means; the identifying means giving identifiers to the respective setting data; the file making means preparing and storing a file of the thus identified setting data; the identifier input means supplying the task programming means with identifiers corresponding to the identified setting data, so that the plurality of teaching data included in the task program further include the corresponding identifiers of the setting data; the setting data extraction means causing the file making means to supply the identified setting data according to the respective identifiers of the teaching data taken out by the teaching data extraction means.

5. The control apparatus according to claim 1, wherein the means for supplying the relation $wXt_j$ and the translational speed $v_j$ comprises teaching data input means which numerically supplies both of the relation $wXt_j$ and the translational speed $v_j$ independently of the setting data input means and the means for determining the relation T.

6. The control apparatus according to claim 5, wherein the setting data input means enters a plurality of setting data; the control apparatus further comprising identifying means, file making means, and setting data extraction means; the identifying means giving identifiers to the respective setting data; the file making means preparing and storing a file of the thus identified setting data; the teaching data input means further supplying the task programming means with identifiers corresponding to the identified setting data, so that the plurality of teaching data included in the task program further include the corresponding identifiers of the setting data; the setting data extraction means causing the file making means to supply the identified setting data according to the respective identifiers of the teaching data taken out by the teaching data extraction means.

* * * * *